United States Patent
Song et al.

(10) Patent No.: US 12,112,186 B2
(45) Date of Patent: Oct. 8, 2024

(54) DEVICE AND METHOD FOR NETWORK RESOURCE MANAGEMENT IN NETWORK FUNCTION VIRTUALIZATION ENVIRONMENT

(71) Applicant: Samsung Electronics Co., Ltd., Suwon-si (KR)

(72) Inventors: Bohyun Song, Suwon-si (KR); Taehyoung Ahn, Suwon-si (KR); Ilkook Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 883 days.

(21) Appl. No.: 17/043,619

(22) PCT Filed: Mar. 18, 2019

(86) PCT No.: PCT/KR2019/003083
§ 371 (c)(1),
(2) Date: Sep. 29, 2020

(87) PCT Pub. No.: WO2019/190095
PCT Pub. Date: Oct. 3, 2019

(65) Prior Publication Data
US 2021/0019173 A1 Jan. 21, 2021

(30) Foreign Application Priority Data
Mar. 30, 2018 (KR) .................. 10-2018-0037297

(51) Int. Cl.
*G06F 9/455* (2018.01)
*H04L 41/0654* (2022.01)
*H04L 61/2503* (2022.01)

(52) U.S. Cl.
CPC ...... *G06F 9/45558* (2013.01); *H04L 41/0654* (2013.01); *H04L 61/2503* (2013.01);
(Continued)

(58) Field of Classification Search
CPC .................................................... G06F 9/45558
See application file for complete search history.

(56) References Cited

U.S. PATENT DOCUMENTS

2001/0042118 A1* 11/2001 Miyake ................... H04L 41/22
709/224
2004/0210623 A1* 10/2004 Hydrie ................ H04L 12/4641
709/201
(Continued)

FOREIGN PATENT DOCUMENTS

EP          3334100 A1      6/2018
KR    10-2012-0072058 A    7/2012
(Continued)

OTHER PUBLICATIONS

International Search Report dated Jul. 2, 2019 in connection with International Patent Application No. PCT/KR2019/003083, 2 pages.
(Continued)

*Primary Examiner* — Charlie Sun

(57) ABSTRACT

The present disclosure relates to a 5th generation (5G) or pre-5G communication system for supporting a higher data transmission rate beyond a 4th generation (4G) communication system such as long term evolution (LTE). An operation method of a control device in a network function virtualization (NFV) environment according to various embodiments of the present disclosure comprises the steps of: determining a virtual compute node corresponding to a server device; identifying physical layer information related to the server device and virtual layer information related to the virtual compute node; and displaying the physical layer information and the virtual layer information. Therefore, various embodiments of the present disclosure enable a user to easily identify a virtual layer element and/or a physical
(Continued)

layer element which causes malfunction, and enable the malfunction to be quickly resolved.

16 Claims, 24 Drawing Sheets

(52) U.S. Cl.
CPC ............... *G06F 2009/4557* (2013.01); *G06F 2009/45591* (2013.01); *G06F 2009/45595* (2013.01)

(56) References Cited

U.S. PATENT DOCUMENTS

| | | |
|---|---|---|
| 2014/0201374 A1 | 7/2014 | Ashwood-Smith et al. |
| 2016/0078342 A1 | 3/2016 | Tang |
| 2016/0224409 A1 | 8/2016 | Liu et al. |
| 2016/0373474 A1 | 12/2016 | Sood et al. |
| 2018/0025083 A1 | 1/2018 | Agarwal et al. |
| 2019/0155632 A1* | 5/2019 | Toy .................... G06F 11/0793 |

FOREIGN PATENT DOCUMENTS

| | | |
|---|---|---|
| KR | 10-2015-0105421 A | 9/2015 |
| KR | 10-2017-0099702 A | 9/2017 |
| KR | 10-2017-0121714 A | 11/2017 |
| WO | 2017045471 A1 | 3/2017 |
| WO | 2018045901 A1 | 3/2018 |

OTHER PUBLICATIONS

Written Opinion of the International Searching Authority dated Jul. 2, 2019 in connection with International Patent Application No. PCT/KR2019/003083, 5 pages.
Examination report dated Dec. 8, 2021, in connection with Indian Application No. 202017046679, 6 pages.
European Patent Office, "Supplementary Partial European Search Report" issued Jun. 7, 2021, in connection with European Patent Application No. 19777190.0, 9 pages.
Communication pursuant to Article 94(3) EPC dated Jan. 9, 2023 in connection with European Patent Application No. 19 777 190.0, 6 pages.
Notice of Patent Grant dated Nov. 15, 2022 in connection with Korean Patent Application No. 10-2018-0037297, 3 pages.
Notice of Preliminary Rejection dated May 24, 2022 in connection with Korean Patent Application No. 10-2018-0037297, 11 pages.
Communication pursuant to Article 94(3) EPC dated Jan. 2, 2024, in connection with European Patent Application No. 19777190.0, 5 pages.

\* cited by examiner

DEVICE AND METHOD FOR NETWORK RESOURCE MANAGEMENT IN NETWORK FUNCTION VIRTUALIZATION ENVIRONMENT

CROSS-REFERENCE TO RELATED APPLICATIONS

This application is a 371 of International Application No. PCT/KR2019/003083 filed on Mar. 18, 2019, which claims priority to Korean Patent Application No. 10-2018-0037297 filed on Mar. 30, 2018, the disclosures of which are herein incorporated by reference in their entirety.

BACKGROUND

1. Field

The present disclosure relates generally to a network function virtualization (NFV) environment, and more particularly, to an apparatus and a method for network resource management in the NFV environment.

2. Description of Related Art

To satisfy a wireless data traffic demand which is growing after a 4th generation (4G) communication system is commercialized, efforts are exerted to develop an advanced 5th generation (5G) communication system or a pre-5G communication system. For this reason, the 5G communication system or the pre-5G communication system is referred to as a beyond 4G network communication system or a post long term evolution (LTE) system.

To achieve a high data rate, the 5G communication system considers its realization in an extremely high frequency (mmWave) band (e.g., 28 GHz or 60 GHz band). To mitigate a path loss of propagation and to extend a propagation distance in the extremely high frequency band, the 5G communication system is discussing beamforming, massive multiple input multiple output (MIMO), full dimensional (FD)-MIMO, array antenna, analog beam-forming, and large scale antenna techniques.

Also, for network enhancement of the system, the 5G communication system is developing techniques such as evolved small cell, advanced small cell, cloud radio access network (RAN), ultra-dense network, device to device (D2D) communication, wireless backhaul, moving network, cooperative communication, coordinated multi-points (CoMP), and receive interference cancellation.

Besides, the 5G system is working on hybrid frequency shift keying and quadrature amplitude modulation (FQAM) and sliding window superposition coding (SWSC) as advanced coding modulation (ACM) schemes, and filter bank multi carrier (FBMC), non orthogonal multiple access (NOMA), and sparse code multiple access (SCMA) as advanced access technologies.

Network function virtualization (NFV) technology may be one solution for smoothly processing the data traffic rapidly growing. The NFV indicates the technology which virtualizes network equipment for performing a network function, and allows a general purpose server device to perform the network function using some of hardware resources abstracted and/or shared. In an NFV environment, since efficiency improvement of the network equipment and a quick respond to a service and/or a service change are required, management on a network malfunction is critical, and proper network resource management related to the malfunction may be required.

Based on the discussion as described above, the present disclosure provides an apparatus and a method for network resource management in a network function virtualization (NFV) environment.

Also, the present disclosure provides an apparatus and a method for associating physical layer information and virtual layer information in an NFV environment.

In addition, the present disclosure provides an apparatus and a method for providing alarms for virtual layer information related to a malfunction if a network malfunction occurs, and physical layer information corresponding to the virtual layer information.

SUMMARY

According to various embodiments of the present disclosure, an operating method of a control device in a network function virtualization (NFV) environment includes determining a virtual compute node corresponding to a server device, identifying physical layer information related to the server device, and virtual layer information related to the virtual compute node, and displaying the physical layer information and the virtual layer information.

According to various embodiments of the present disclosure, an operating method of a physical infrastructure manager (PIM) device in an NFV environment includes receiving identification information including an identifier of at least one virtual compute node, from a virtual infrastructure manager (VIM) device, based on the identification information, determining an identification key of at least one server device corresponding to the at least one virtual compute node, and transmitting the identification key of the at least one server device to a control device.

According to various embodiments of the present disclosure, a control device in an NFV environment includes a control unit for determining a virtual compute node corresponding to a server device, and identifying physical layer information related to the server device, and virtual layer information related to the virtual compute node, and a display unit for displaying the physical layer information and the virtual layer information.

According to various embodiments of the present disclosure, a PIM device in an NFV environment includes a communication unit for receiving identification information including an identifier of at least one virtual compute node, from a VIM device, and a control unit for determining an identification key of at least one server device corresponding to the at least one virtual compute node. based on the identification information. The communication unit transmits the identification key of the at least one server device to a control device.

An apparatus and a method according to various embodiments of the present disclosure, may provide alarms relating to virtual layer information related to a malfunction if a network malfunction occurs in a network function virtualization (NM environment, and physical layer information corresponding to the virtual layer information, and thus allow a user to easily identify a virtual layer element and/or a physical layer element causing the malfunction, and to quickly resolve the malfunction.

Effects obtainable from the present disclosure are not limited to the above-mentioned effects, and other effects

DETAILED DESCRIPTION

Figure 1:
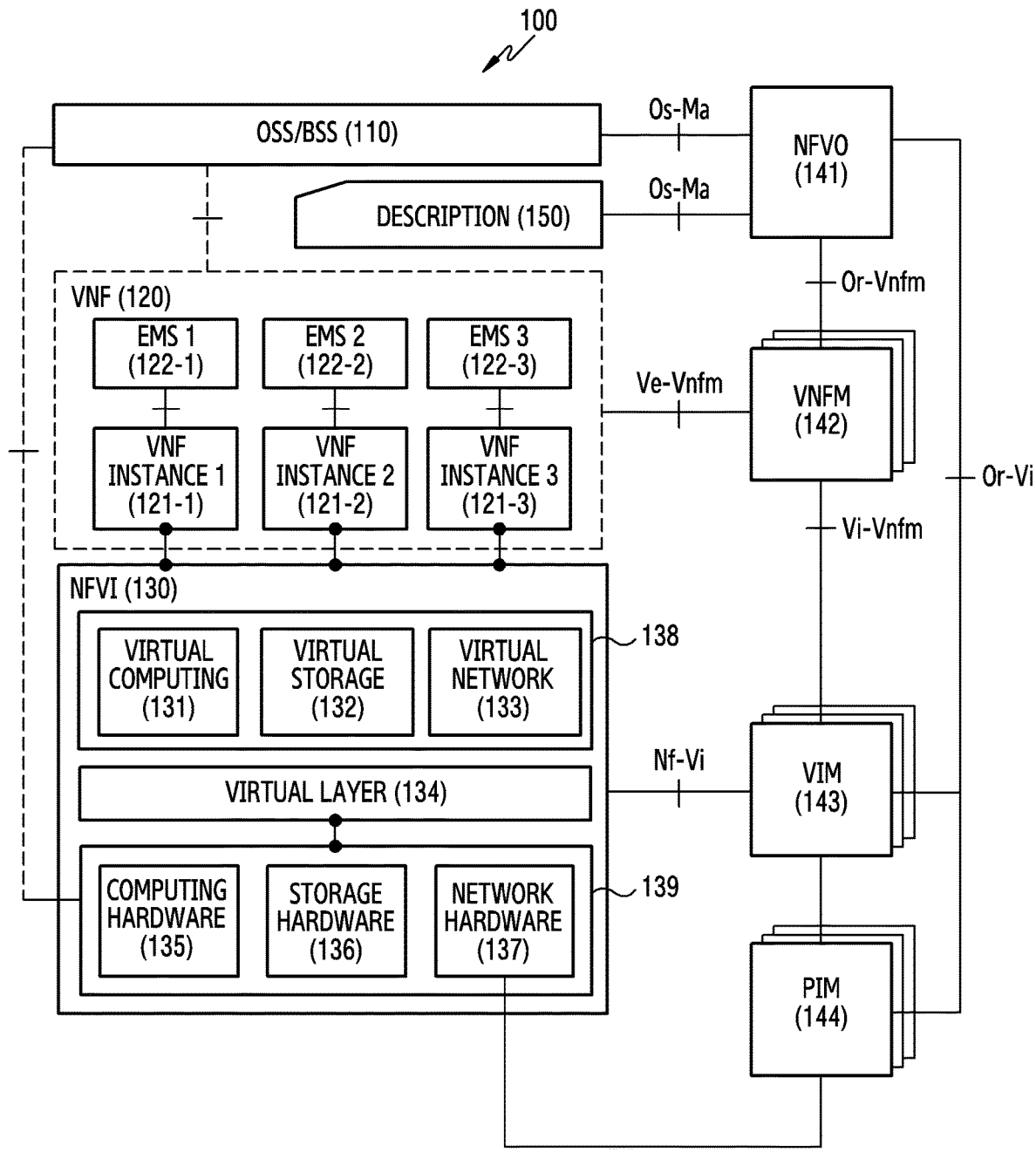
FIG. 1 illustrates a network function virtualization (NFV) environment according to various embodiments of the present disclosure.

Terms used in the present disclosure are used for describing particular embodiments, and are not intended to limit the scope of other embodiments. A singular form may include a plurality of forms unless it is explicitly differently represented. All the terms used herein, including technical and scientific terms, may have the same meanings as terms generally understood by those skilled in the art to which the present disclosure pertains. Among terms used in the present disclosure, the terms defined in a general dictionary may be interpreted to have the same or similar meanings with the context of the relevant art, and, unless explicitly defined in this disclosure, it shall not be interpreted ideally or excessively as formal meanings. In some cases, even terms defined in this disclosure should not be interpreted to exclude the embodiments of the present disclosure.

In various embodiments of the present disclosure to be described below, a hardware approach will be described as an example. However, since the various embodiments of the present disclosure include a technology using both hardware and software, the various embodiments of the present disclosure do not exclude a software-based approach.

Hereafter, the present disclosure relates to an apparatus and a method for network resource management in a network function virtualization (NFV) environment. Specifically, the present disclosure describes a technique for associating physical layer information and virtual layer information in the NFV environment, and providing alarms of virtual layer information related to a malfunction if a network malfunction occurs and physical layer information corresponding to the virtual layer information.

Hereinafter, definitions of terms used in the present disclosure are as follows.

'NFV' means virtualizing network equipment which perform a network function.

'virtualization' means abstracting hardware resources (e.g., computing resources, memory resources, network resources). By the virtualization, the hardware resources of the network equipment (e.g., general purpose server devices) are abstracted and/or shared, and some of the total hardware resources are used to perform a specific network function. For example, a plurality of network functions may be performed in one network equipment according to the virtualization.

'NFV environment' means an environment, a network and/or a system in which the network function is conducted at the virtualized network equipment.

'virtualized network function (VNF)' means the network function performed in the NFV environment.

'virtual machine (VM)' means a virtual logical entity which performs a unit VNF.

'physical layer' means the hardware resources, physical nodes using the hardware resources and/or a structure of the physical nodes.

'virtual layer' means the virtualized resources, virtual nodes using the virtualized resources and/or a function performed using the virtualized resources.

'virtual compute node' means a virtual logical entity for creating/deleting, changing, controlling or managing the VM. One virtual compute node may operate in one server device, and may correspond to one server device.

Terms indicating network entities, and terms indicating components of an apparatus, which are used in the following descriptions, are for the sake of explanations. Accordingly, the present disclosure is not limited to the terms to be described, and may use other terms having technically identical meaning.

FIG. 1 illustrates an NFV environment 100 according to various embodiments of the present disclosure.

Referring to FIG. 1, the NFV environment 100 may include an operation support system (OSS)/business support system (BSS) 110, a VNF 120, an NFV infrastructure (NFVI) 130, an NFV orchestrator (NFVO) device 141, VNF manager (VNFM) device(s) 142, virtual infrastructure manager (VIM) device(s) 143, a physical infrastructure manager (PIM) device 144f and description 150.

The OSS/BSS 110 may manage communications equipment and the NFV environment 100. For example, the OSS/BSS 110 may support network management of an operator and provision and maintenance of a customer service, or may support billing for customers, customer relationship management, and call center business automation.

The VNF 120 may include VNF instances 121-1, 121-2, and 121-3, and may further include element management systems (EMSs) 122-1, 122-2, and 122-3 corresponding to them respectively. In some embodiments, the VNF may be a function of virtualized core network equipment. For example, the VFN may be a function of a virtualized mobility management entity (MEE), or a function of a virtualized service gateway (S-GW).

The NFVI 130 may include hardware resources 139 (e.g., computing hardware 135, storage hardware 136, and network hardware 137), a virtual layer 134, and virtualized resources 138 (e.g., virtual computing 131, virtual storage 132, and a virtual network 133). In FIG. 1, the virtual layer 134 and the virtualized resources 138 are separated, but the virtual layer 134 may include the virtualized resources 138.

The NFVO device 141 may control and/or manage the NFV environment 100. For example, the NFVO device 141 may manage the VNF 120 by controlling the VNFM device 142, the virtual layer 134 and/or may manage the virtualized resources 138 by controlling the VIM device 143, and the NFV device 141 may manage the hardware resources 139 by controlling the PIM device 144. For doing so, the NFVO device 141 may communicate with the VNFM device 142, the VIM device 142 and the PIM device 143, and exchange data. In addition, the NFVO device 141 may include a user interface (UI) for providing the received data to the user. According to various embodiments of the present disclosure, the 'NFVO device' may be referred to as an 'NFV environment control device', a 'control device', or an 'NFVO'.

The VNFM device 142 may manage the VNF 120 deployed in the NFV environment 100, and communicate with the VIM device 143 to generate virtualized resources for the VNF 120. For example, the VNFM device 142 may create and/or delete a VNF, or change, control or manage the VNF. The VNFM device 142 may transmit information relating to the VNF 120 to the NFVO device 141. According to various embodiments of the present disclosure, the 'VNFM device' may be simply referred to as a 'VNFM'.

The VIM device 143 may manage the virtual layer 134 and/or the virtualized resources 138. The VIM device 143 may receive from the NFVO device 141 and/or the VNFM device 142 a request for allocating the virtual resources for the VNF 120 and/or the virtual layer 134. The VIM device 143 may provide the NFVO device 141 and/or the PIM device 144 with information relating to the virtual layer 134 and/or the virtualized resources 138. The 'VIM device' may be referred to simply as a 'VIM'.

The PIM device 144 may manage the physical layer and/or the hardware resources 139. The PIM device 144 may provide the NFVO device 141 with information of the physical layer and/or the hardware resources 139. According to various embodiments of the present disclosure, the PIM device 144 may receive information of the virtual layer 134 and/or the virtualized resources from the VIM device 143. The 'PIM device' may be referred to simply as a 'PIM'.

The description 150 may provide service information, VNF information, and infrastructure information to at least one of the NFVO device 141, the VNFM device 142, the VIM device 143 and the PIM device 144.

The NFVO environment 100 may include a plurality of VNFM devices including the VNFM device 142, a plurality of VIM devices including the VIM device 143, and a plurality of PIM devices including the PIM device 144. Each of the plurality of the VNFM devices may perform the same function as the VNFM device 142, each of the plurality of the VIM devices may perform the same function as the VIM device 143, and each of the plurality of the PIM devices may perform the same function as the PIM device 144. The NFVO device 141 may manage a plurality of data centers (DCs), and each data center may include one PIM device, one or more VIM devices, and one or more VNFM devices. The NFVO device 141 may include VNFM devices, VIM devices and/or PIM devices included in the plurality of the DCs. In the following FIG. 2, a hierarchical structure of the nodes (e.g., VNFM device(s), VIM device(s), PIM device(s)) managed by the NFVO device 141 is described.

Figure 2:
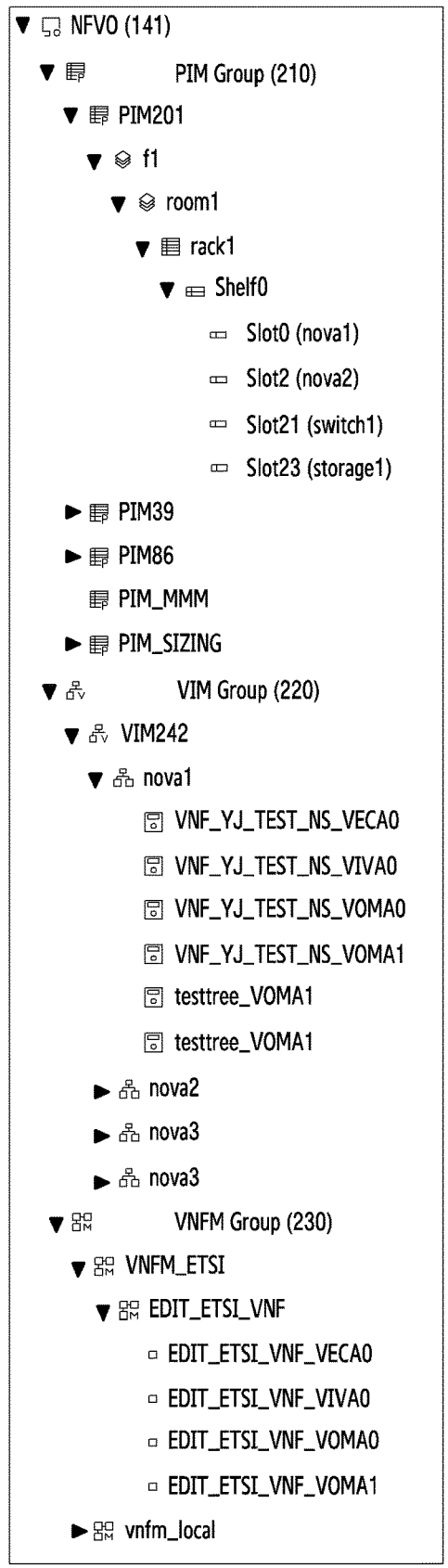
FIG. 2 illustrates a hierarchical diagram of nodes managed by a control device in an NFV environment according to various embodiments of the present disclosure.

FIG. 2 illustrates a hierarchical diagram 200 of nodes managed by a control device in an NFV environment according to various embodiments of the present disclosure. The hierarchical diagram 200 may be displayed at the NFVO device 141. Referring to FIG. 2, the NFVO 141 may manage a PIM group 210, a VIM group 220 and a VNFM group 230.

The PIM group 210 may include a plurality of PIM devices PIM201, PIM39, PIM86, PIM_MNM and PIM_SIZING. Since one PIM device and one DC correspond to each other, each PIM may represent a physical infrastructure of the DC corresponding to each PIM. For example, the DC corresponding to the PIM 201 may include a floor f1, the floor f1 may include a room room1, the room room1 may include a rack rack1, the rack rack1 may include a shelf shelf0, and the shelf0 may include a plurality of slots slot0, slot1, slot21, and slot 23. Herein, the rack indicates a set of server devices, switches and/or storages, the shelf indicates one of rack's partitions (e.g., horizontal partitions), and the slot indicates one of the shelf's partitions (e.g., vertical partitions). A server device, a switch or a storage may be disposed in one slot. For example, a server device nova1 may be disposed in slot0, a server device nova2 may be disposed in slot2, a switch switch21 may be disposed in slot21, and a storage storage1 may be disposed in slot 23. Herein, the expressions such as 'nova1' and 'nova2' may be an identifier of the server device, or a host name.

According to various embodiments of the present disclosure, the floor, the room, the rack, the shelf and/or the slot may indicate a location of a device. For example, the location of the server device nova1 may be expressed as f1-room1-rack1-shelf0-slot0 of PIM201, and the location of the server device nova2 may be expressed as f1-room1-rack1-shelf0-slot2 of PIM201. In other words, the location of the physical device may be expressed with at least one or a combination of the identifier, the floor, the room, the rack, the shelf and the slot of the PIM.

The VIM group 220 may include a VIM device VIM242. The VIM242 may include a plurality of virtual compute nodes nova1, nova2, nova3 and nova4. Herein, the expression such as 'nova1', 'nova2', 'nova3' or 'nova4' may be an identifier of the virtual compute node, or a host name. At least one VM may operate at each of the plurality of the virtual compute nodes. For example, in the virtual compute node nova1, a plurality of VMs VNF_YJ_TEST_NS_VECA0, VNF_YJ_TEST_NS_VIVA0, VNF_YJ_TEST_NS_VOMA0, VNF_YJ_TEST_NS_VOMA1, testtree_VOMA1 and treetest_VOMA1 may operate.

The VNFM group 230 may include a plurality of VNFM devices VNFM_ETSI and VNFM_local. For example, VNFM_ETSI may control and/or manage a VNF_EDIT_ETSI_VNF. EDIT_ESTI_VNF may include a plurality of VNF components (VNFCs) EDIT_ETSI_VNF_VECA0, EDIT_ETSI_VNF_VIVA0, EDIT_ETSI_VNF_VOMA0 and EDIT_ETSI_VNF_VOMA1.

In FIG. 2, the number and/or the name of the nodes depicted in the hierarchical diagram 200 are exemplary, and various modifications are possible. For example, the VIM group 220 may include a plurality of VIM devices including VIM 242fmf.

Figure 3:
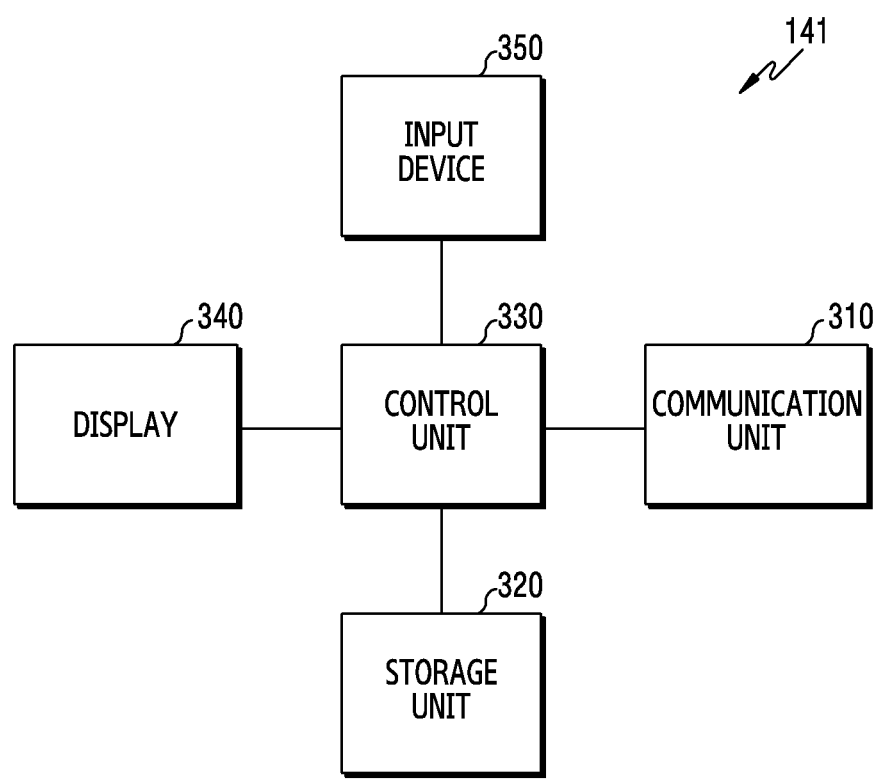
FIG. 3 illustrates a configuration of a control device in an NFV environment according to various embodiments of the present disclosure.

FIG. 3 illustrates a configuration of a control device in an NFV environment according to various embodiments of the present disclosure. The configuration illustrated in FIG. 3 may be understood as the configuration of the NFVO device 141. A term such as 'portion' or '~er' used hereafter indicates a unit for processing at least one function or operation, and may be implemented using hardware, software, or a combination of hardware and software.

Referring to FIG. 3, the control device may include a communication unit 310, a storage unit 320, a control unit 330, a display 340 and an input device 350.

The communication unit 310 provides an interface for communicating with other nodes in the network. That is, the communication unit 310 converts a bit string transmitted from the server to other node, for example, a base station, a core network, an authentication server and so on, to a physical signal, and converts a physical signal received from other node to a bit string. That is, the communication unit 310 may transmit and receive a signal. Accordingly, the communication unit 310 may be referred to as a modem, a transmitter, a receiver, or a transceiver. In this case, the communication unit 310 enables the control device to communicate with other devices or systems via a backhaul connection (e.g., a wired backhaul or a wireless backhaul) or over the network.

The storage unit 320 stores a basic program for operating the server, an application program, and data such as setting information. In particular, the storage unit 320 may store information indicating a correspondence between the server device and the virtual compute node. For example, the correspondence between the server device and the virtual compute node may be represented by a mapping table, and the storage unit 320 may store the mapping table. The storage unit 320 provides the stored data according to a request of the control unit 330.

The control unit 330 controls the overall operations of the control device. For example, the control unit 330 transmits and receives a signal through the communication unit 310. In addition, the control unit 330 records and reads data in and from the storage 320. For doing so, the control unit 330 may include at least one processor.

According to various embodiments, the control unit 330 may determine a virtual compute node corresponding to the server device, identify physical layer information related to the server device and virtual layer information related to the virtual compute node, and control the display 340 to display the physical layer information and the virtual layer information. For example, the control unit 330 may control the server to perform operations according to various embodiments to be described below.

The display 340 may display a screen including an image, graphics, text, and the like. For example, the display 340 may be formed of a liquid crystal, a light emitting diode display, or other material. The display 340 may display a screen corresponding to the data received through the control unit 330. In addition, the display 340 may include a touch screen for detecting a user input.

The input device 350 may receive an input from the user. For doing so, the input device 350 may include an input interface. The input received through the input device 350 may be processed at the control unit 330, and then transmitted to the display 340, the storage unit 320 and the communication unit 310. Thus, information corresponding to the input received through the input device 350 may be displayed on the display 340, transmitted to other device through the communication unit 310, or stored in the storage unit 330.

Figure 4:
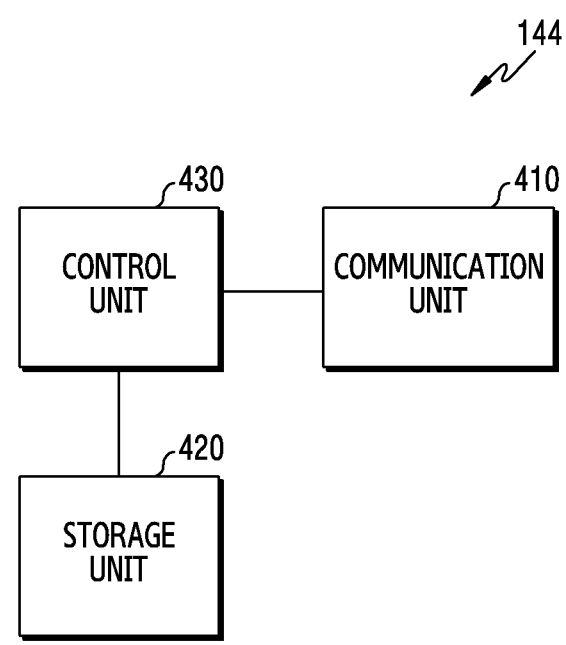
FIG. 4 illustrates a configuration of a physical infrastructure manager (PIM) device in an NFV environment according to various embodiments of the present disclosure.

FIG. 4 illustrates a configuration of a PIM device in an NFV environment according to various embodiments of the present disclosure. The configuration illustrated in FIG. 4 may be understood as the configuration of the PIM device 144. A term such as 'portion' or '~er' used hereafter indicates a unit for processing at least one function or operation, and may be implemented using hardware, software, or a combination of hardware and software.

Referring to FIG. 4, the PIM device may include a communication unit 410, a storage unit 420, and a control unit 430.

The communication unit 410 provides an interface for communicating with other nodes in the network. That is, the communication unit 410 converts a bit string transmitted from a server to other node, for example, a base station, a core network, an authentication server and so on, to a physical signal, and converts a physical signal received from other node to a bit string. That is, the communication unit 410 may transmit and receive a signal. Accordingly, the communication unit 310 may be referred to as a modem, a transmitter, a receiver, or a transceiver. In this case, the communication unit 410 may enable the control device to communicate with other devices or systems via a backhaul connection (e.g., a wired backhaul or a wireless backhaul) or over the network.

The storage unit 420 stores a basic program for operating the server, an application program, and data such as setting information. In particular, the storage unit 420 may store an identification key of each of server devices managed by the PIM device. The storage unit 420 provides the stored data according to a request of the control unit 430.

The control unit 430 controls the overall operations of the control device. For example, the control unit 430 transmits and receives a signal through the communication unit 410. In addition, the control unit 430 records and reads data in and from the storage 420. For doing so, the control unit 430 may include at least one processor.

According to various embodiments, the control unit 430 may control the communication unit 410 to receive identification information including an identifier of at least one virtual compute node from the VIM device, determine an identification key for at least one server device corresponding to at least one virtual compute node based on the identification information, and control the communication unit 410 to transmit the identification key of the at least one server device to the control device. For example, the control unit 430 may control the server to perform operations according to various embodiments to be described.

Figure 5A:
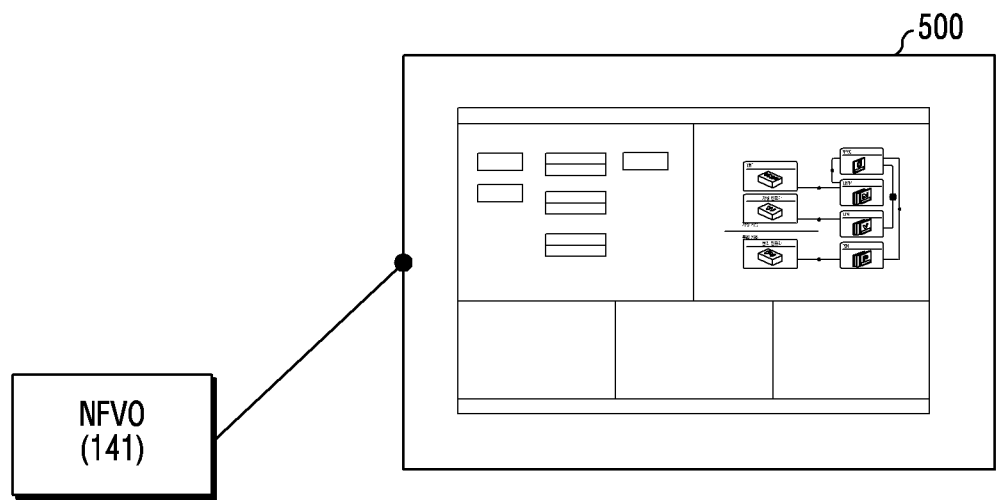
FIG. 5A and FIG. 5B illustrate connections between nodes displayed on a control device and a connection related to a node having a malfunction in an NFV environment according to various embodiments of the present disclosure.
Figure 5B:
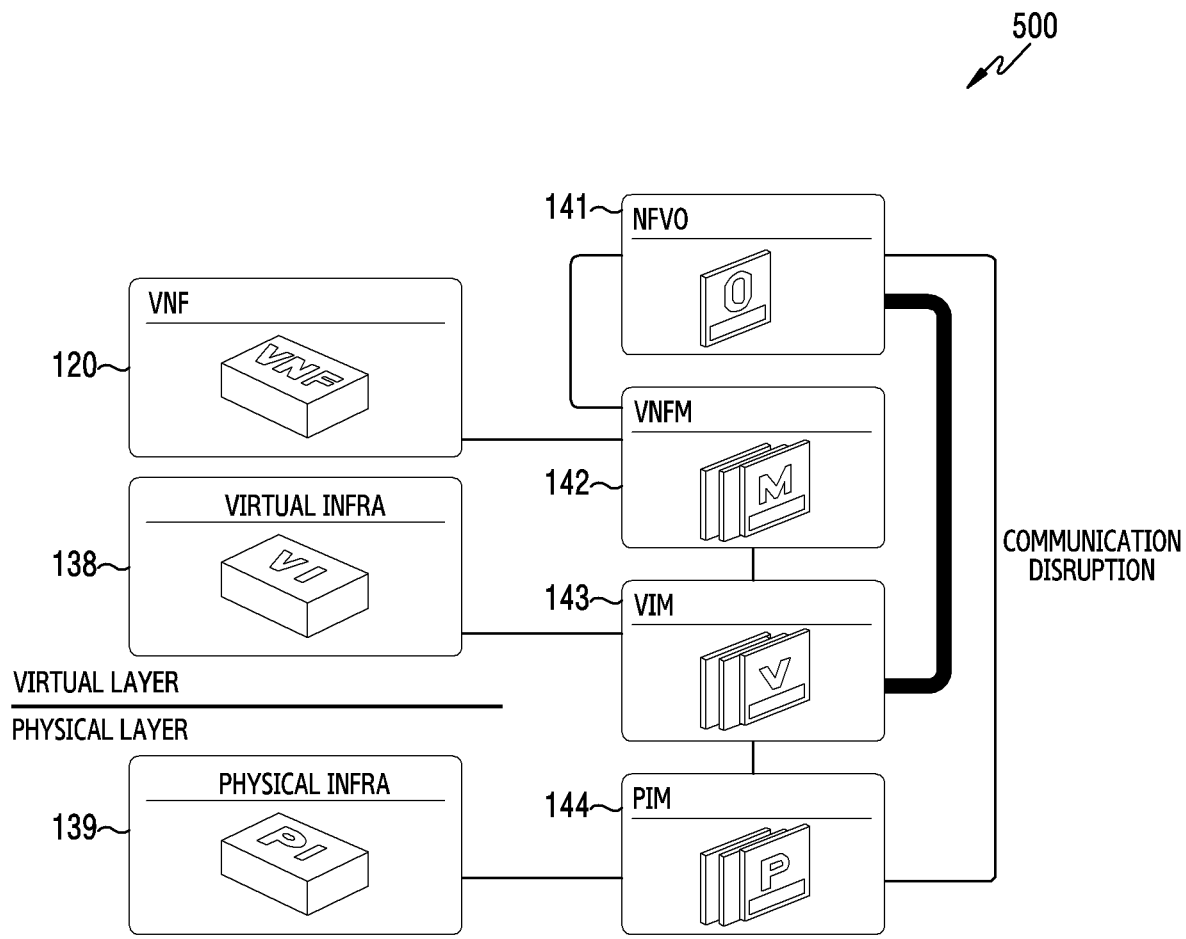

FIG. 5A and FIG. 5B illustrate connections between nodes displayed at a control device and a connection related to a node having a malfunction in an NFV environment according to various embodiments of the present disclosure.

Referring to FIG. 5A and FIG. 5B, the control device (e.g., the NFVO device 141) may display nodes in the NFV environment and connection relationships between the nodes through a UI 500. For example, the NFVO device 141 may display the NFVO device 141, the VNFM device 142, the VIM device 143 and the PIM device 144 which are the nodes in the NFV environment, and display the connection relationships between the nodes. The connection relationship between the nodes in FIG. 5B is expressed with a line, indicating that the corresponding nodes may exchange data. In addition, the NFVO device 141 may display an object managed and/or controlled by each of the nodes. For example, the NFVO device 141 may display the VNF 120 controlled and/or managed by the VNFM device 142, the virtual resources 138 controlled and/or managed by the VIM device 143, and the hardware resources 139 controlled and/or managed by the PIM device 144. Herein, the VNF 120 and the virtual resources 138 belong to the virtual layer, and the hardware resources 139 belong to the physical layer. In the UI 500, the correspondence between the management entity and the management object is indicated by a connecting line.

According to various embodiments of the present disclosure, the NFVO device 141 may display information indicating a malfunction occurred in the NFV environment. The NFVO device 141 may detect the malfunction, and display information indicating a node related to the malfunction. For example, if detecting a malfunction related to the VIM device 143 (e.g., communication disruption between the NFVO device 141 and the VIM device 143) as shown in FIG. 5B, the NFVO device 141 may indicate the malfunction related to the VIM device 143, by displaying a line connecting the NFVO device 141 and the VIM differently from other lines.

Malfunction types which may occur in the NFV environment and classification of nodes related to the malfunction are shown in the following Table 1.

TABLE 1

| Node | Malfunction types | Explanation |
| --- | --- | --- |
| VNFM | BLOCK FAIL | Occurs when the software block of VNFC does not operate properly |
| | Function Fail | Occurs when VNFC does not operate properly |
| | Overload | Occurs when the amount of session, CPU(central processing unit), memory used for VNF operation exceeds a threshold |
| VIM | VM status ERROR | Indicates that an error has occurred in the status of the VM managed by VIM |
| | Host Unavailable | Occurs when the virtual compute node is unavailable |
| PIM | NIC(network interface card) port down | Occurs when ports on server device and switch are down |
| | interface down | Occurs when the connection to the IMPL(intelligent platform management interface) and server device is lost |

TABLE 1-continued

| Node | Malfunction types | Explanation |
| --- | --- | --- |
| | fan status | Occurs when the fan status of a physical device(e.g. server device) is abnormal |
| | power status | Occurs when the power status of a physical device(e.g. server device) is abnormal |
| | boot status | Occurs when the boot status of server device is abnormal |
| | thermal status | Occurs when the temperature of a physical device(e.g. server device) is abnormal |

In Table 1, the types of the malfunctions related to each node are exemplary, and the malfunction of a different type may occur to each node.

For example, if a malfunction occurs, the VNFM device 142, the VIM device 143 and/or the PIM device 144 may provide an alarm of the malfunction to the NFVO device 141, so that the NFVO device 141 may display information indicating the node related to the malfunction. As another example, the NFVO device 141 may monitor whether a malfunction related to each node occurs, and display information indicating the node related to the malfunction if the malfunction occurs. In this case, the NFVO device 141 may detect the malfunction for each node without receiving an alarm of the malfunction failure from the VNFM device 142, the VIM device 143 and/or the PIM device 144, and display information related to the malfunction.

Although not depicted, the NFVO device 141 may display information indicating the type of the malfunction, in addition to the information indicating the node related to the malfunction through the UI 500. For example, if a malfunction 'VM status error' related to the VIM device 143 occurs, the NFVO device 141 may display a message 'VM status error' through the UI 500.

Figure 6:
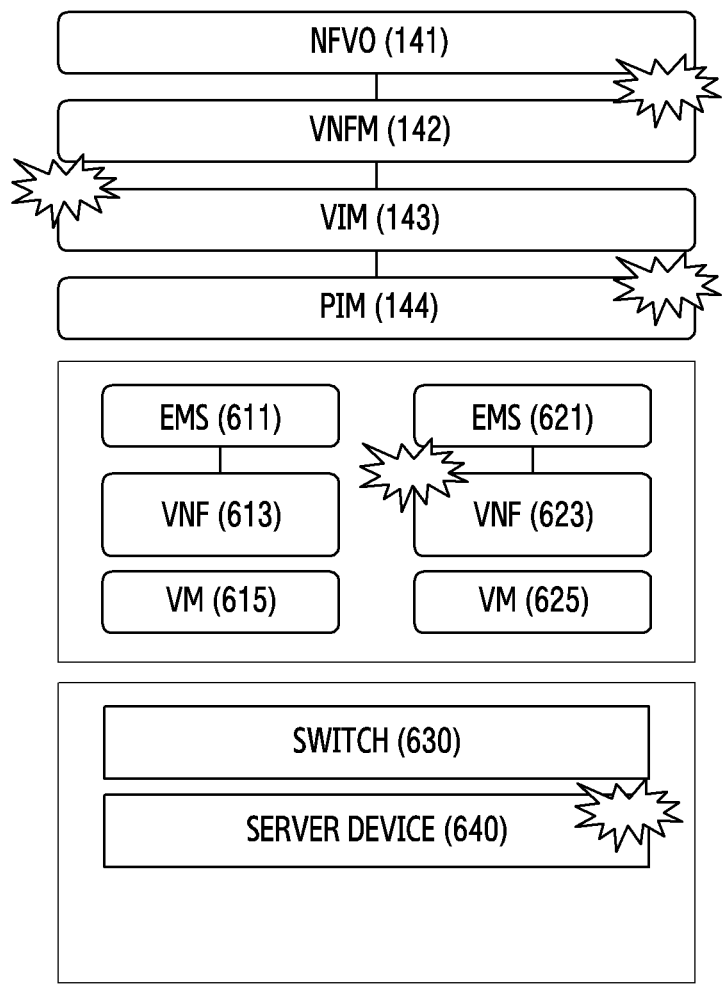
FIG. 6 illustrates a malfunction and mapping between nodes in an NFV environment according to various embodiments of the present disclosure.

FIG. 6 illustrates a malfunction and mapping between nodes in an NFV environment according to various embodiments of the present disclosure.

By receiving an alarm of a malfunction, or by monitoring a malfunction, the NFVO device 141 may detect the malfunction related to each of nodes (e.g., the VNFM devices 142, the VIM 143 and the PIM 144). Hence, the NFVO device 141 may map the detected malfunction, to a node related to the malfunction.

Further, the NFVO device 141 may identify a detailed element of each node causing the detected malfunction. For example, if the NFVO device 141 detects a malfunction related to the VNFM device 142, the NFVO device 141 may identify the VNF 623 which causes the malfunction among the detailed elements (including EMS 611, EMS 621, VNF 613, and VNF 623) managed by the VNFM device 142. As another example, if the NFVO device 141 detects a malfunction related to the VIM 143, the NFVO device 141 may identify a VM 615 causing the malfunction among the detailed elements (including the VM 615, a VM 625) managed by the VIM 143. As another example, if the NFVO device 141 detects a malfunction related to the PIM device 144, the NFVO device 141 may identify a server device 640 causing the malfunction among the detailed elements (including a switch 630 and the server device 640) managed by the PIM device 144. As described above, the NFVO device 141 may identify the detailed element of each node causing the malfunction, and map the malfunction to the identified detailed element.

According to various embodiments of the present disclosure, each node related to the malfunction may identify the detailed element causing the malfunction, and provide information of the identified detailed element to the NFVO device 141. For doing so, the NFVO device 141 may control each node, so that each node may identify the detailed element causing the malfunction.

If a malfunction occurs in the virtual layer, the NFVO device 141 may identify a detailed element of the virtual layer causing the malfunction. The NFVO device 141 may solve the malfunction by examining the identified detailed element, or display information indicating the type of the malfunction and the identified detailed element. However, even if the detailed element of the virtual layer is fully examined, the malfunction occurring in the virtual layer may not be resolved. For example, if a physical port (e.g., a physical port of the server device 640) corresponding to the VM 615 is down, a malfunction may occur from the VM 615, but the malfunction may not be resolved unless a cause of the physical port down is solved though the VM 615 is examined. In other words, the malfunction occurring in the virtual layer may be related to the physical layer, and accordingly even if the NFVO device 141 and/or the user examines the virtual layer, the malfunction may not be resolved unless the cause of the physical layer is resolved. By contrast, a malfunction in the physical layer may be related to the virtual layer, and accordingly even if the NFVO device 141 and/or the user examines the physical layer, the malfunction may not be resolved unless the cause of the virtual layer is resolved.

Thus, various embodiments of the present disclosure provide an apparatus and a method for associating the physical layer information and the virtual layer information. By associating the physical layer information and the virtual layer information, the NFVO device 141 may display the associated physical layer information and virtual layer information together. For example, the NFVO device 141 may display virtual layer information related to the VM 615, and physical layer information related to the server device 640 corresponding to the VM 615. In addition, if detecting a malfunction, the NFVO device 141 may display physical layer information related to the malfunction, together with virtual layer information related to the malfunction. Hence, the NFVO device 141 and/or the user may easily identify the physical layer element and the virtual layer element causing the malfunction, and quickly solve the malfunction.

In the following FIG. 7, a specific method for displaying the physical layer information and the virtual layer information together shall be described.

Figure 7:
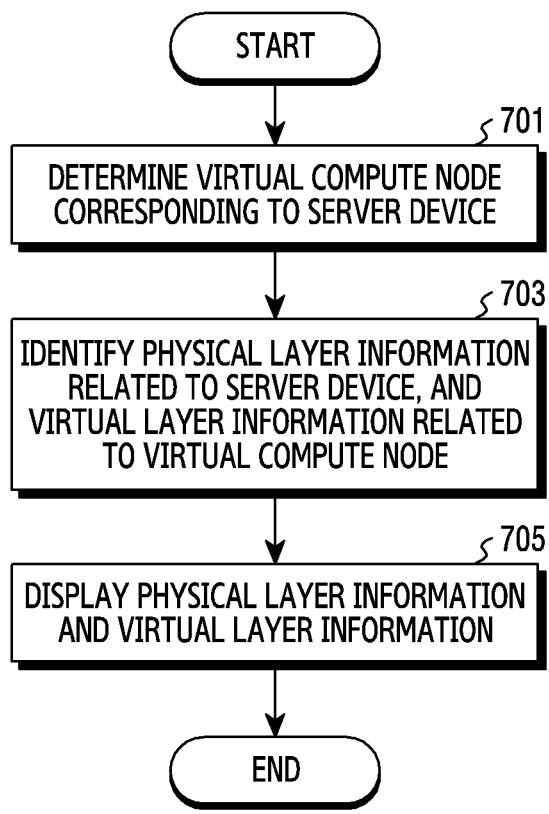
FIG. 7 illustrates a flowchart of a control device in an NFV environment according to various embodiments of the present disclosure.

FIG. 7 illustrates a flowchart of a control device in an NFV environment according to various embodiments of the present disclosure. FIG. 7 illustrates operations of the NFVO device 141.

Referring to FIG. 7, in step 701, the control device determines a virtual compute node corresponding to a server device. Associating physical layer information and virtual layer information may start from determining a pair of corresponding virtual compute node and server device among a plurality of virtual compute nodes managed by a VIM device (e.g., the VIM device 143) and a plurality of server devices managed by a PIM device (e.g., the PIM device 144) in the NFV environment. In other words, the control device may determine a virtual compute node corresponding to each of the plurality of server devices among the plurality of the virtual compute nodes. A specific method of determining the virtual compute node corresponding to the server device shall be described in more detail in FIG. 8.

In step 703, the control device identifies physical layer information related to the server device and virtual layer information related to the virtual compute node. The physical layer information may include at least one of a host name of the server device, a location of the server device, and at least one physical port disposed in the server device. The virtual layer information may include at least one of a host name of the virtual compute node, an identifier or a list of VM(s) running on the virtual compute node, an identifier or a list of VNF(s) performed by the VM, and an identifier of the VIM managing the virtual compute node, and information of the VNFM device managing the VNF(s).

In step 705, the control device displays the physical layer information and the virtual layer information. For example, the control device may display the VM running on the virtual compute node as the virtual layer information related to the virtual compute node, and display the physical port of the server device corresponding to the VM as the physical layer information related to the server device. Further, the control device may display the correspondence between the VM and the physical port corresponding to the VM.

Figure 8:
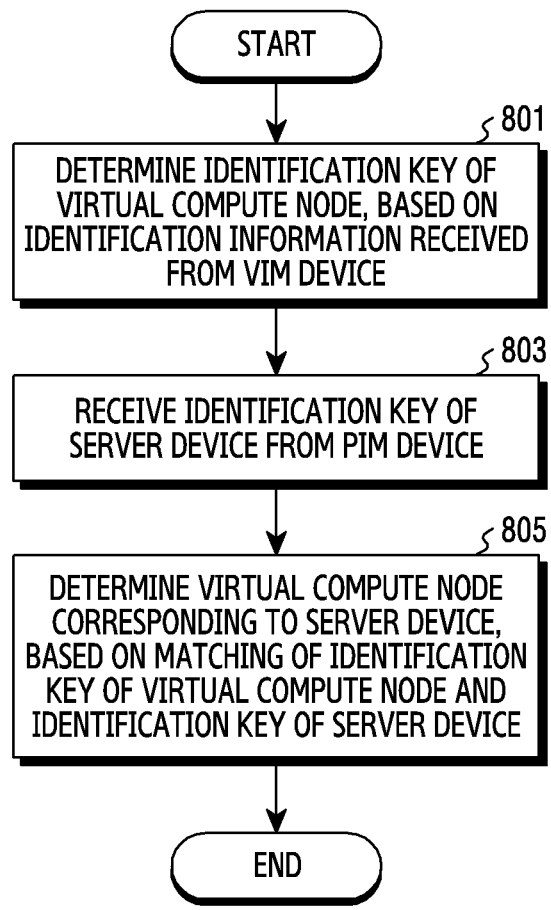
FIG. 8 illustrates a flowchart of a control device for determining a virtual compute node corresponding to a server device in an NFV environment according to various embodiments of the present disclosure.

FIG. 8 illustrates a flowchart of a control device for determining a virtual compute node corresponding to a server device in an NFV environment according to various embodiments of the present disclosure. FIG. 8 illustrates operations of the NFVO device 141.

Referring to FIG. 8, in step 801, the control device determines an identification key of a virtual compute node, based on identification information received from the VIM device. The identification key may also be referred to as a host key. The identification information may include at least one of an identifier of the virtual compute node and at least one user identifier of the VIM device. The identifier of the virtual compute node may be referred to as the host name of the virtual compute node. The user identifier of the VIM device may be referred to as a universally unique identifier (UUID) or a tenant identifier. For example, the control device may determine the identification key of the virtual compute node based on the identifier of the virtual compute node. As another example, the control device may determine the identification key of the virtual compute node by combining the identifier of the virtual compute node and at least one user identifier of the VIM device. As another example, the control device may determine the identification key of the virtual compute node by hashing the identifier of the virtual compute node and at least one user identifier of the VIM device. Herein, a hashing function SHA224 may be used for the hashing.

In step 803, the control device receives an identification key of the server device from the PIM device. The identification information of step 801 may be transmitted from the VIM device also to the PIM device, and the PIM device may determine the identification key of the server device based on the identification information. A specific method for the PIM device to determine the identification key of the server device shall be described in detail in FIG. 10.

In step 805, the control device determines a virtual compute node corresponding to the server device, based on matching of the identification key of the virtual compute node and the identification key of the server device. If the identification key of the virtual compute node and the identification key of the server device match, the control device may determine that the virtual compute node and the server device correspond. If the identification key of the virtual compute node and the identification key of the server device do not match, the control device may determine that the virtual compute node and the server device do not correspond, and determine a corresponding virtual compute node by matching the identification key of the server device to an identification key of other virtual compute node.

Figure 9:
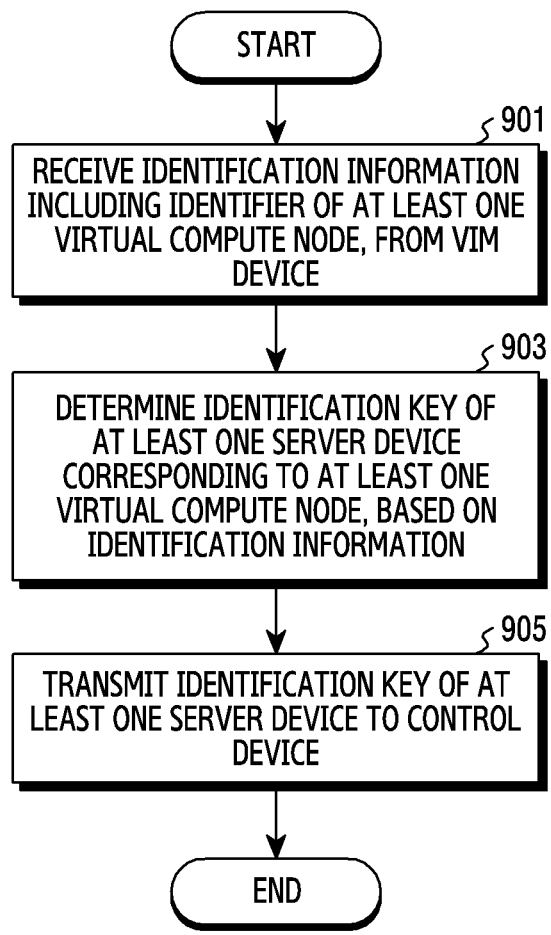
FIG. 9 illustrates a flowchart of a PIM device in an NFV environment according to various embodiments of the present disclosure.

FIG. 9 illustrates a flowchart of a PIM device in an NFV environment according to various embodiments of the present disclosure. FIG. 9 illustrates operations of the PIM device 144.

Referring to FIG. 9, in step 901, the PIM device receives identification information including an identifier of at least one virtual compute node, from the VIM device. The identification information may include a list of virtual compute node(s) or a list of identifier(s) of the virtual compute node(s). The list of the virtual compute node(s) or the list of the identifier(s) of the virtual compute node(s) may be referred to as a hypervisor list or a compute node list. The identification information may further include a list of user identifier(s) of the VIM device. The list of the user identifier(s) of the VIM device may be referred to as a tenant list. To receive the identification information from the VIM device, the PIM device may transmit a message for requesting the identification information to the VIM device.

In step 903, based on the identification information, the PIM device determines an identification key of at least one server device corresponding to the at least one virtual compute node. For doing so, the PIM device may determine a server device corresponding to each of the virtual compute nodes. The PIM device may determine the server device corresponding to the virtual compute node, based on matching of an internet protocol (IP) address of the virtual compute node with an IP address of the server device. In other words, the PIM device may determine that a server device having the same IP address as the IP address of each virtual compute node corresponds to each virtual compute node. As another example, the PIM device may determine a server device corresponding to the virtual compute node, based on matching a host name of the virtual compute node and a host name of the server device. In other words, the PIM device may determine that the server device having the same host name as the host name of each virtual compute node corresponds to each virtual compute node. As another example, to determine the server device corresponding to each virtual compute node, the PIM device may use the IP address and the host name. For example, if the PIM device may not determine the server device corresponding to each virtual compute node by using the IP address alone, the PIM device may complementarily use the host name. In addition, if the PIM device may not determine the server device corresponding to each virtual compute node by using the host name alone, the PIM device may complementarily use the IP address. In addition, the PIM device may determine a server device corresponding to the virtual compute node, based on matching the host name and the IP address of the virtual compute node with the host name and the IP address of the server device. In other words, the PIM device may determine that the server device having the same IP address and host name as the IP address and host name of each virtual compute node corresponds to each virtual compute node. According to an embodiment, the PIM device may determine an identification key for each server device, based on an identifier of the virtual compute node corresponding to each server device. As another example, the PIM device may determine the identification key of each server device, by combining the identifier of the virtual compute node corresponding to each server device and the user identifier of the VIM device. As another example, the PIM device may determine the identification key of each server device, by hashing the identifier of the virtual compute node corresponding to each server device and the user identifier of the VIM device. Herein, the hashing function SHA224 may be used for the hashing.

In step 905, the PIM device transmits the identification key of at least one server device to the control device. The control device may determine the virtual compute corresponding to each server device, based on matching the identification key of the at least one server device received from the PIM device and the identification key of the at least one virtual compute node received from the VIM device.

Figure 10:
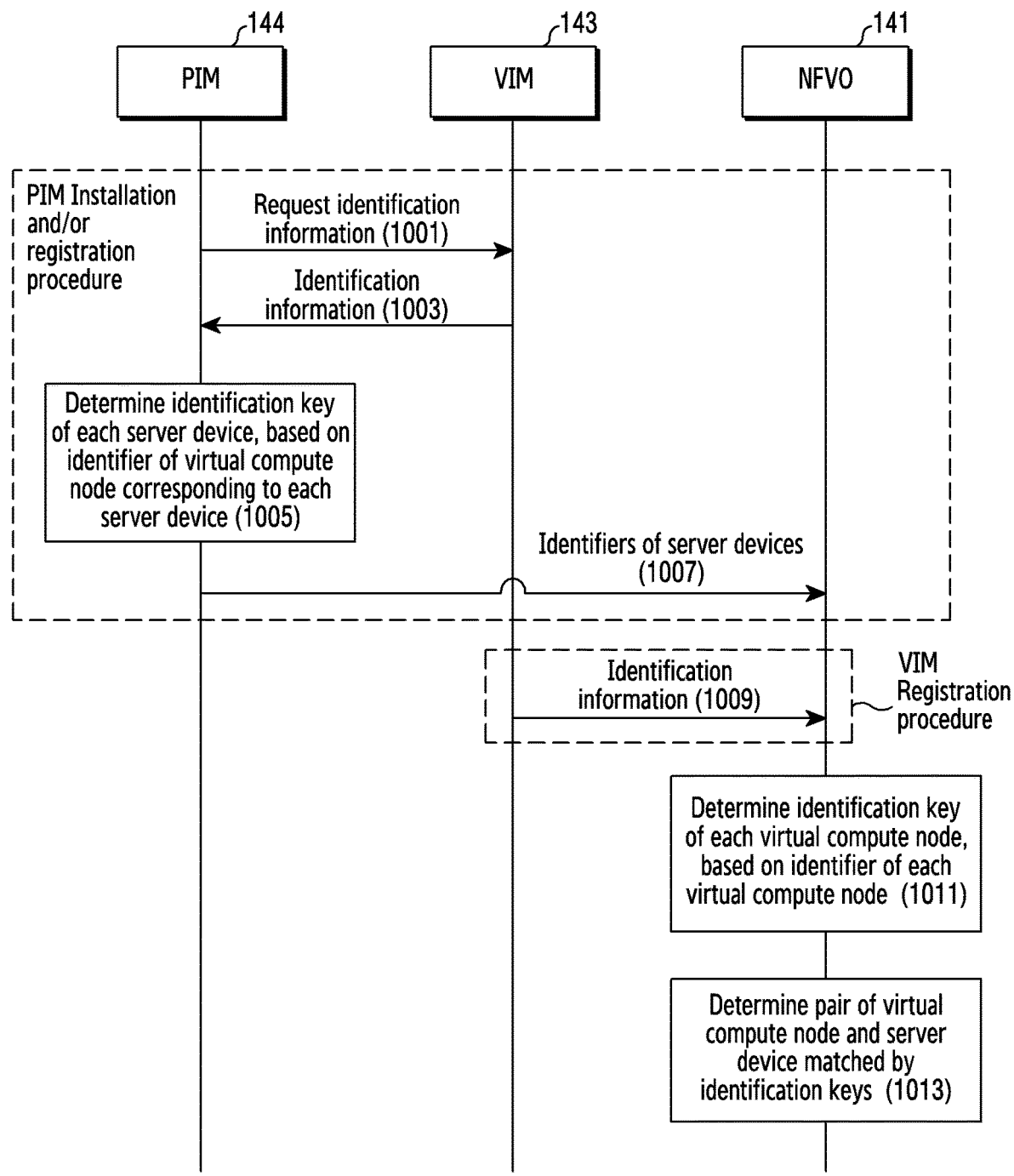
FIG. 10 illustrates signal flows between nodes for determining a virtual compute node corresponding to a server device in an NFV environment according to various embodiments of the present disclosure.

FIG. 10 illustrates signal flows between nodes for determining a virtual compute node corresponding to a server device in an NFV environment according to various embodiments of the present disclosure. FIG. 10 illustrates the signal flows between the NFVO device 141, the VIM device 143 and the PIM device 144.

Referring to FIG. 10, in step 1001, the PIM device 144 transmits a message requesting identification information to the VIM device 143. The message requesting the identification information may be transmitted in a procedure for installing the PIM device 144.

In step 1003, the VIM device 143 transmits the identification information to the PIM device 144, in response to the identification information request. The identification information may include a list (or a hypervisor list) of virtual compute nodes managed by the VIM device 143 and/or a list (or a tenant list) of at least one user identifier of the VIM device 143.

In step 1005, the PIM device 144 determines an identification key of each server device, based on an identifier of a virtual compute node corresponding to each of the server devices managed by the PIM device 144. For doing so, the PIM device 144 may determine the virtual compute node corresponding to each server device, by matching the virtual compute nodes with server devices having the same IP address and/or the same host name. According to an embodiment, the number of the server devices may be greater than the number of the virtual compute nodes, and in this case, there may be no corresponding virtual compute nodes for some server device(s) among the server devices managed by the PIM device 144. As another example, the PIM device 144 may determine an identification key of each server device, based on an identifier of a virtual compute node corresponding to each of the server devices managed by the PIM device 144, and at least one user identifier of the VIM device 143. In this case, for a plurality of user identifiers of the VIM device 143, a plurality of identification keys may also be determined for each server device. For example, the number of the user identifiers of the VIM device 143 and the number of the identification keys for each server device may be the same. As another example, the PIM device 144 may determine the identification key of each server device, by combining or hashing the identifier of the virtual compute node corresponding to each of the server devices managed by the PIM device 144 and at least one user identifier of the VIM device 143. Herein, the hashing function SHA224 may be used for the hashing.

In step 1007, the PIM device 144 transmits the identification keys of the server devices to the NFVO device 141. The identification keys of the server devices may be transmitted in a procedure for registering the PIM device 144.

In step 1009, the VIM device 143 transmits the identification information to the NFVO device 141. The identification information transmitted in step 1009 may be the same as the identification information transmitted in step 1003. The VIM device 143 may transmit the identification information to the NFVO device 141 in a procedure for registering the VIM device.

In step 1011, the NFVO device 141 determines an identification key of each virtual compute node, based on the identifier of each of the virtual compute nodes managed by the VIM device 143. As another example, the NFVO device 141 may determine the identification key of each virtual compute node, based on the identifier of each of the virtual compute nodes managed by the VIM device 143 and at least one user identifier of the VIM device 143. In this case, for a plurality of user identifiers of the VIM device 143, a plurality of identification keys may also be determined for each virtual compute node. For example, the number of the user identifiers of the VIM device 143 and the number of the identification keys for each virtual compute node may be the same. As another example, the NFVO device 141 may determine the identification key for each virtual compute node, by combining or hashing the identifier of each of the virtual compute nodes and at least one user identifier of the VIM device 143. Herein, the hashing function SHA224 may be used for the hashing.

In step 1013, the NFVO device 141 determines a pair of a virtual compute node and a server device of which the identification keys match. The NFVO device 141 may determine the pair of the virtual compute node and the server device of the matching identification keys, among the plurality of the virtual compute nodes managed by the VIM device 143 and the plurality of the server devices managed by the PIM device 144. If a plurality of identification keys exists for each virtual compute node and each server device, it may be required to match at least some of the identification keys, or all the identification keys to determine that the server device and the virtual compute node correspond to each other. Based on matching the identification keys, the NFVO device 141 may determine the virtual compute node corresponding to each of the server devices managed by the PIM device 144. Alternatively, the NFVO device 141 may determine the server device corresponding to each of the virtual compute nodes managed by the VIM device 143, based on matching the identification keys.

Step 1001 through step 1007 may be carried out during the procedure for installing the PIM and/or the procedure for registering the PIM. In addition, step 1009 may be performed during the procedure for registering the VIM. In FIG. 10, the PIM installation and/or registration procedure is performed before the VIM registration procedure, which is exemplary, and the PIM installation and/or registration procedure may be performed after the VIM registration procedure.

Figure 11:
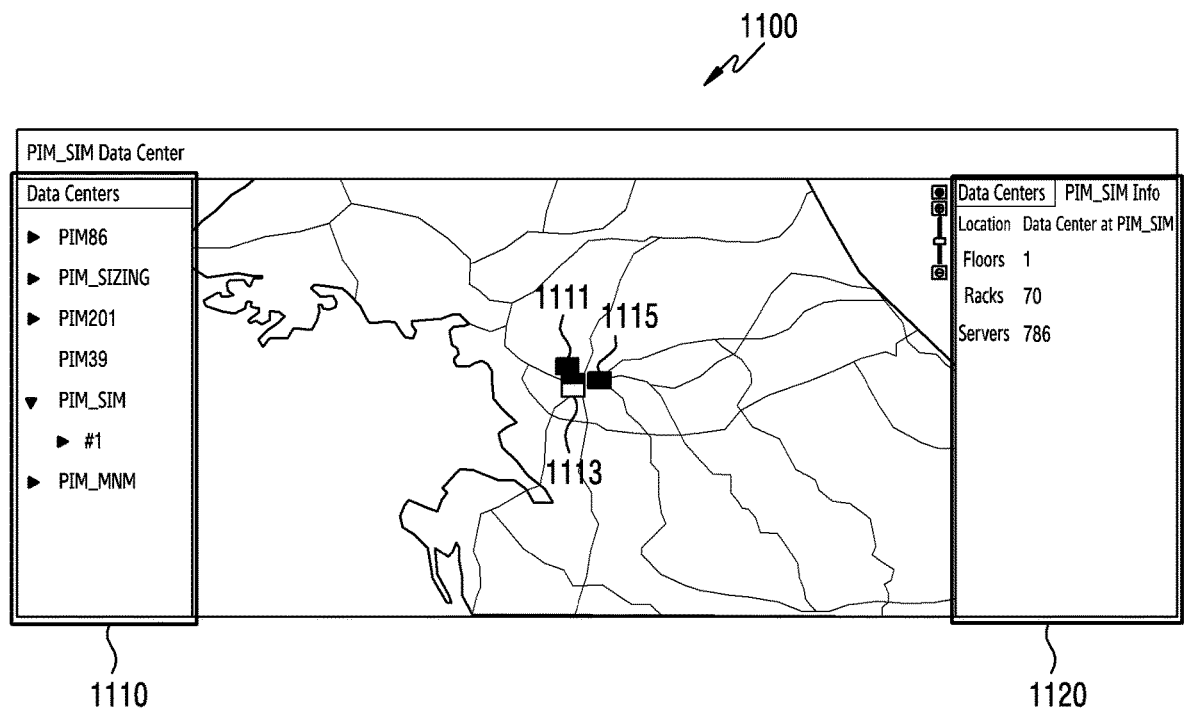
FIG. 11 illustrates locations of data centers (DCs) managed by a control device in an NFV environment according to various embodiments of the present disclosure.

FIG. 11 illustrates locations of DCs managed by a control device in an NFV environment according to various embodiments of the present disclosure.

Referring to FIG. 11, the NFVO device 141 may display location information of DCs 1111, 1113, and 1115 managed by the NFVO device 141 based on geographic information system (GIS) information through a UI 1100. The NFVO device 141 may display information of DCs and/or PIM devices (e.g., PIM86, PIM_SIZING, PIM201, PIM39, PIM_SIM, and PIM_MNM) managed by the NFVO device 141 in an area 1110 of the UI 1100. The NFVO device 141 may receive an input for selecting at least one of the DCs 1111, 1113 and 1115 through the UI 1100. For example, if the DC 1113 is selected according to the received input, the NFVO device 141 may display information of the selected DC 1113 and/or information of the PIM device (e.g., PIM_SIM) corresponding to the selected DC 1113 through an area 1120 of the UI 1100. For example, as shown in the drawing, the area 1120 may display information indicating that the DC 1113 includes one floor, includes 70 racks, and includes 786 server devices.

Figure 12:
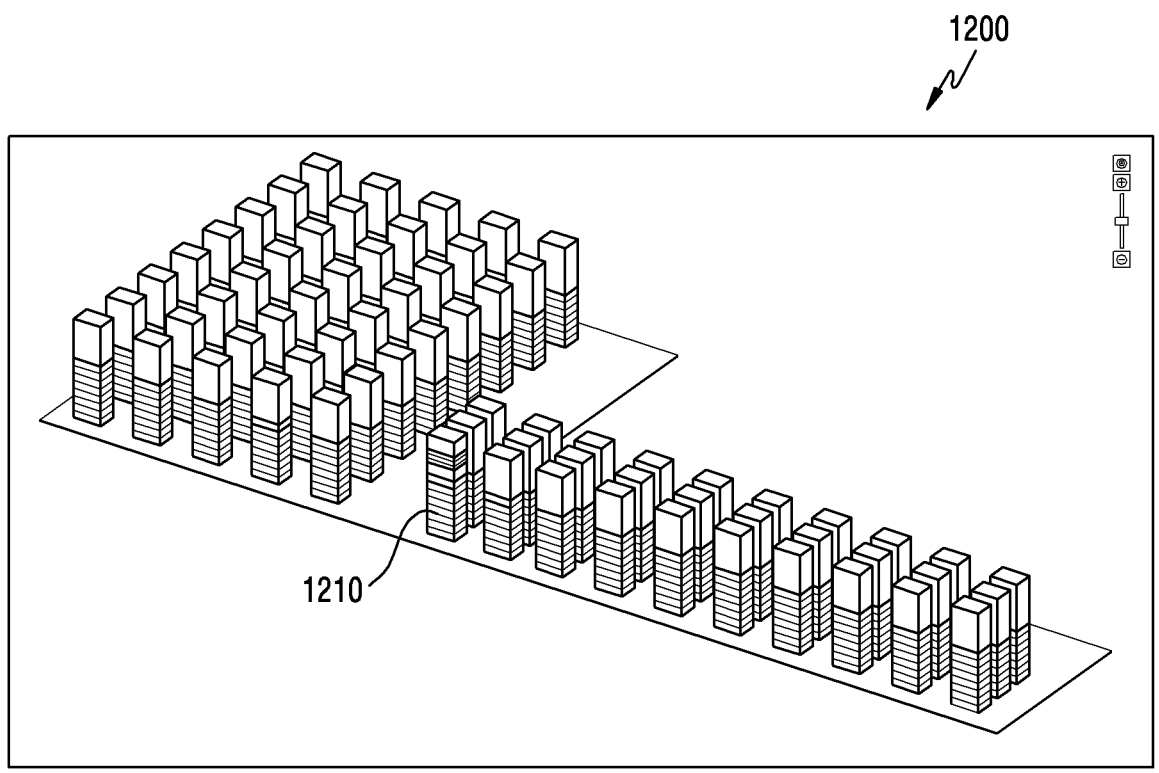
FIG. 12 illustrates racks included in a DC in an NFV environment according to various embodiments of the present disclosure.

FIG. 12 illustrates racks included in a DC in an NFV environment according to various embodiments of the present disclosure. In FIG. 12, while the rack has the form of a rectangular pillar, which is exemplary, various modifications may be made to the shape of the rack.

Referring to FIG. 12, the NFVO device 141 may display a plurality of racks including a rack 1210 through a UI 1200. The plurality of the racks displayed through the UI 1200 may be racks included in a room of one floor in the DC. The arrangement of the racks displayed through the UI 1200 may correspond to an actual arrangement of the racks in the DC. The NFVO device 141 may receive an input for selecting at least one of the plurality of racks displayed through the UI 1200. For example, if the rack 1210 is selected according to the received input, the NFVO device 141 may display information of the selected rack 1210 as shown in FIG. 13.

Figure 13:
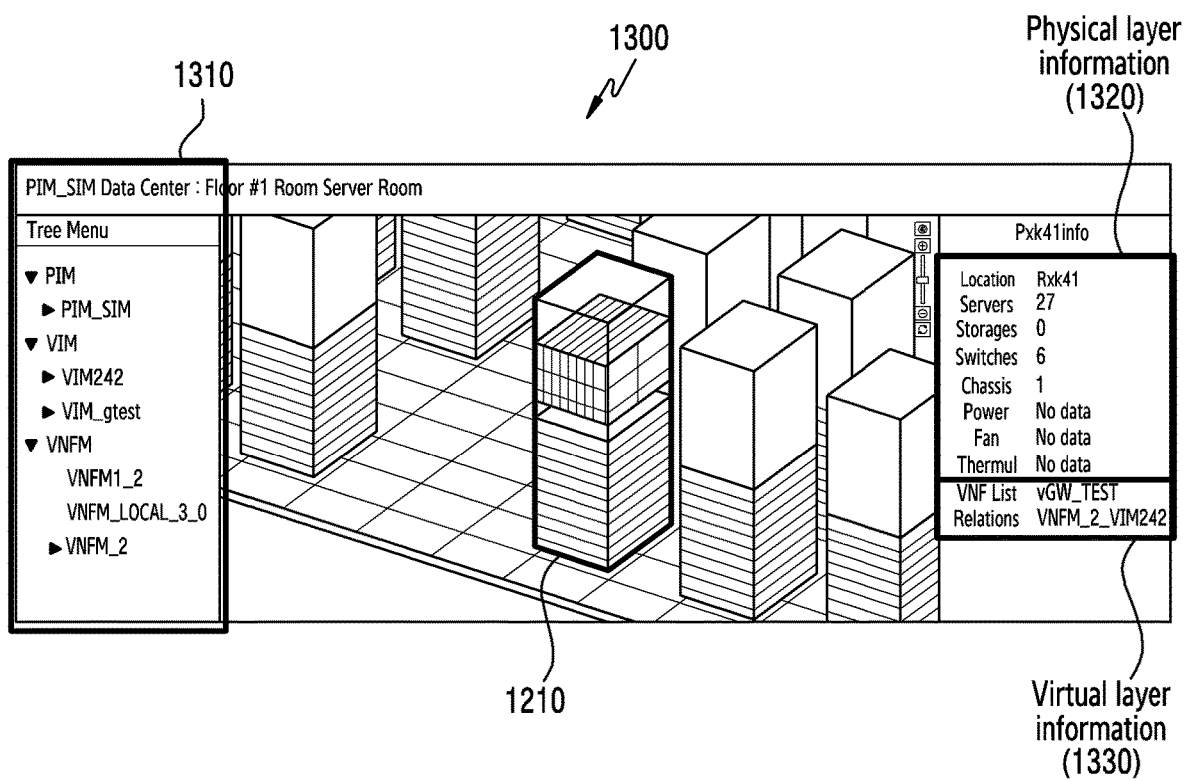
FIG. 13 illustrates physical layer information and virtual layer information for a rack in an NFV environment according to various embodiments of the present disclosure.

FIG. 13 illustrates physical layer information and virtual layer information of a rack in an NFV environment according to various embodiments of the present disclosure.

Referring to FIG. 13, the NFVO device 141 may display physical layer information 1320 related to the rack 1210 selected according to an input received through a UI 1300, and virtual layer information 1330 related to the rack 1210.

The physical layer information 1320 may include information related to server devices, switches and/or storages included in the rack 1210. For example, the physical layer information 1320 may include information indicating that the rack 1210 includes 27 servers, does not include a storage and a switch, and includes one chassis.

The virtual layer information 1330 may include information related to virtual compute nodes corresponding to the server devices included in the rack 1210. For example, the virtual layer information 1330 may include a list of VNFs (e.g., vGW_TEST) performed by virtual compute nodes corresponding to the server devices included in the rack 1210, and information relating to a VNFM device (e.g., VNFM_2) managing the VNFs, and a VIM device (e.g., VIM242) managing the compute nodes.

In addition, the NFVO device 141 may display basic information of the DC including the rack 1210 in an area 1310 of the UI 1300. For example, the NFVO device 141 may display information indicating that a PIM device corresponding to the DC including the rack 1210 is PIM_SIM, the DC includes VIM devices VIM242 and VIM_gtest, and the DC includes VNFM devices VNFM1_2, VNFM_LOCAL_3_0, and VNFM_2 in the area 1310.

Figure 14:
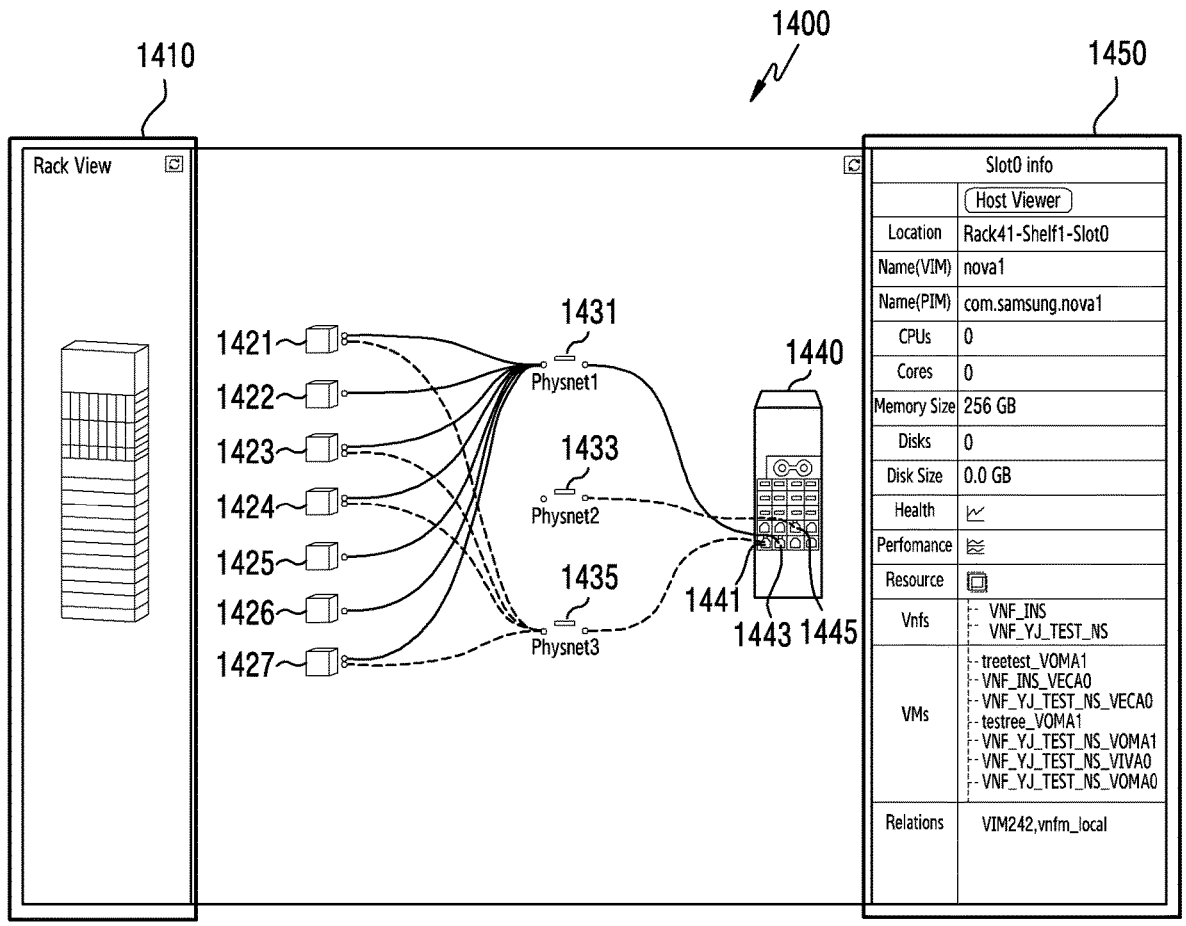
FIG. 14 illustrates physical layer information and virtual layer information for a server device in an NFV environment according to various embodiments of the present disclosure.

FIG. 14 illustrates physical layer information and virtual layer information of a server device in an NFV environment according to various embodiments of the present disclosure.

Referring to FIG. 14, the NFVO device 141 may display a rack including a server device 1440 in an area 1410 of a UI 1400. In the area 1410, a relative position of the server device 1440 in the rack may be displayed.

The NFVO device 141 may display the server device 1440, physical ports (e.g., physical ports 1441, 1443, 1445) included in the server device 1440, and VMs 1421, 1422, 1423, 1424, 1425, 1426, and 1427 operating at a virtual compute node corresponding to the server device 1440 through the UI 1400. In addition, the NFVO device 141 may display through the UI 1400 physnet1 1431 connected to the VMs 1421, 1422, 1423, 1424, 1425, 1426 and 1427, phsynet3 1435 connected to the VMs 1421, 1423, 1424 and 1427, and physnet2 not connected to the VM. In the present disclosure, the physnet (e.g., the physnet1 1431, the physnet2 1433, the physnet3 1435) indicates a network layer mapped to a physical port in the virtual layer. For example, at least one physical port may correspond to one physnet, and at least one physnet may correspond to one physical port. As shown in FIG. 14, the physnet1 1431 may correspond to the physical port 1443, the physnet2 1433 may correspond to the physical port 1445, and the physnet3 1435 may correspond to the physical port 1441.

According to various embodiments of the present disclosure, the NFVO device 141 may display a connection relationship between the VM and the physnet, may display correspondence between the physnet and the physical port, and thus may display correspondence between the VM and the physical port. For example, the NFVO device 141 may display that the VMs 1421, 1422, 1423, 1424, 1425, 1426 and 1427 correspond to the physical port 1443 via the physnet1 1431, and the VMs 1421, 1423, 1424 and 1427 correspond to the physical port 1441 via the physnet3 1435. Hence, if a malfunction occurs to the VM, the NFVO device 141 and/or the user may easily identify the physical port corresponding to the malfunctioned VM, a server device including the physical port, and a switch connected to the physical port, and the malfunction may be resolved quickly. Specific scenarios for responding to the malfunction shall be described in more detail in FIG. 18A and FIG. 18D.

The NFVO device 141 may display information of the server device 1440 in an area 1450 of the UI 1400. The information displayed in the area 1450 may include physical layer information related to the server device 1440, and virtual layer information related to a virtual compute node corresponding to the server device 1440. For example, the NFVO device 141 may display at least one of a location (e.g., rack41-shelf1-slot0) of the server device 1440, an identifier or host name (e.g., com.samsung.nova1) of the server device 1440, the number of CPUs and cores included in the server device 1440, sizes of a memory and a disk included in the server device 1440, the number of disks included in the server device 1440, and status information (e.g., health, performance, resource) of the server device 1440 as the physical layer information related to the server device 1440 in the area 1450. In addition, the NFVO device 141 may display at least one of an identifier or host name (e.g., nova1) of the virtual compute node, a list of VMs operating in the virtual compute node, a list of VNFs conducted by the VMs, a VNFM device managing the VNFs, and a VIM device managing the virtual compute node as virtual layer information related to the virtual compute node corresponding to the server device 1440 in the area 1450.

Although not depicted, if detecting a malfunction, the NFVO device 141 may display virtual layer information related to the malfunction, together with physical layer information related to the malfunction. For example, if a malfunction occurs in the VM 1421, the NFVO device 141 may display information indicating the malfunction occurred in the VM 1421, and information indicating the physical port 1441 and the physical port 1443 corresponding to the VM 1421 through the UI 1400. Further, the NFVO device 141 may display virtual layer information related to the malfunctioned VM 1421, and physical layer information (e.g., information of the server device 1440 including the physical port 1441 and the physical port 1443, information of a switch connected to each of the physical port 1441 and the physical port 1443) related to the physical port 1441 and the physical port 1443 corresponding to the VN 1421.

Figure 15:
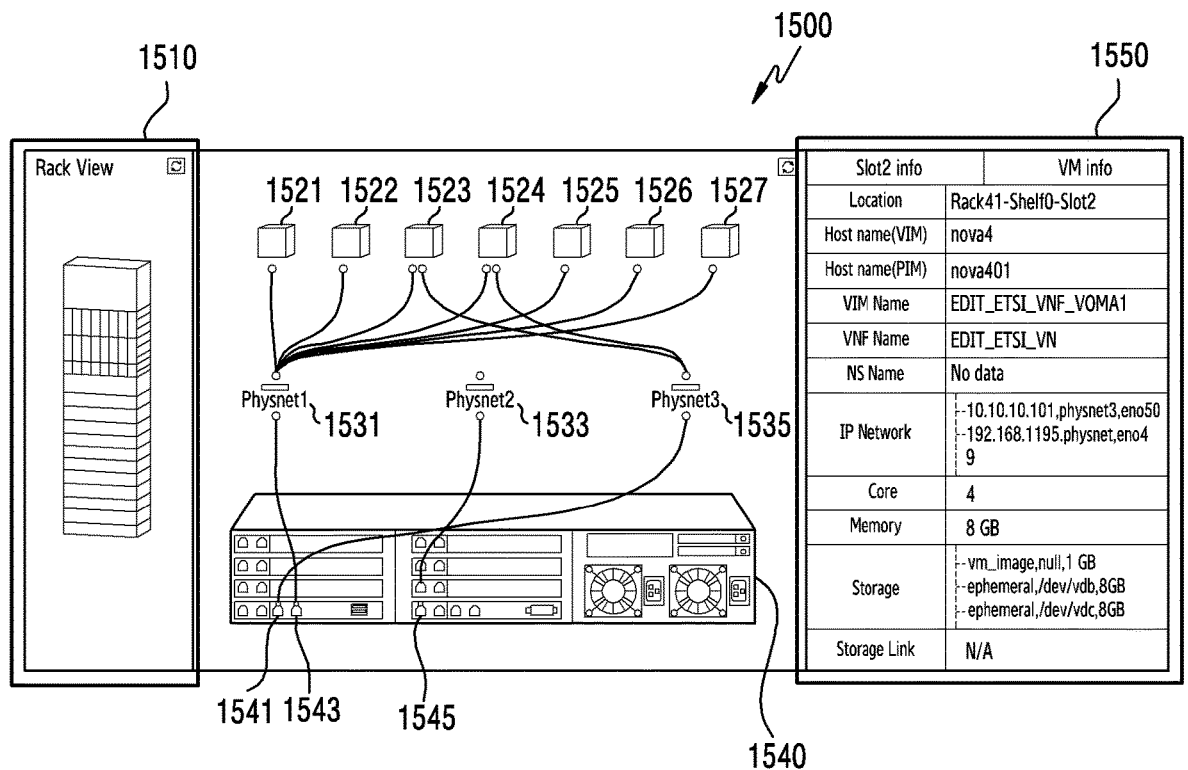
FIG. 15 illustrates detailed information of a virtual machine (VM) in an NFV environment according to various embodiments of the present disclosure.

FIG. 15 illustrates detailed information of a VM in an NFV environment according to various embodiments of the present disclosure.

Referring to FIG. 15, the NFVO device 141 may display a rack including a server device 1540 in an area 1510 of a UI 1500. In the area 1510, a relative position of the server device 1540 in the rack may be displayed.

The NFVO device 141 may display through the UI 1500 the server device 1540, physical ports (e.g., physical ports 1541, 1543, 1545) included in the server device 1540, and VMs 1521, 1522, 1523, 1524, 1525, 1526 and 1527 operating in the virtual compute node corresponding to the server device 1540. In addition, the NFVO device 141 may display physnet1 1531 connected to the VMs 1521, 1522, 1523, 1524, 1525, 1526 and 1527, physnet2 1533 not connected to the VM, and physnet3 1535 connected to the VMs 1523 and 1524. The Physnet1 1531 may correspond to the physical port 1543, the phsynet2 1533 may correspond to the physical port 1545, and the physnet3 1535 may correspond to the physical port 1541.

The NFVO device 141 may display a relationship between the VM and the physnet, display correspondence between the physnet and the physical port, and thus display correspondence between the VM and the physical port. For example, the NFVO device 141 may display that the VMs 1521, 1522, 1523, 1524, 1525, 1526 and 1527 correspond to the physical port 1543 via the phsynet1 1531, and the VMs 1523 and 1524 corresponds to the port 1541 via the physnet3 1535.

The NFVO device 141 may receive an input for selecting a VM through the UI 1500. For example, if the VM 1523 is selected according to the received input, the NFVO device 141 may display information of the VM 1523 in an area 1550 of the UI 1500. For example, the NFVO device 141 may display in the 1550 at least one of a location (e.g., rack41-shelf0-slot2) of the server device 1540 including the physical port 1541 and the physical port 1543 corresponding to the VM 1523, an identifier or host name (e.g., nova4) of the virtual compute node where the VM 1523 operates, an identifier or host name (e.g., nova401) of the server 1540, a VIM device managing the VM 1523, a VNFM managing the VNF conducted by the VM 1523, at least one IP address assigned to the VM 1523, an amount of physical and/or virtual computing resources (e.g., the number of physical and/or virtual cores, the size of the physical and/or virtual memory) allocated to the VM 1523, a size and a name of the allocated physical and/or virtual storage allocated to the VM 1523, and a location of an external storage if the VM 1523 uses the external storage.

Figure 16:
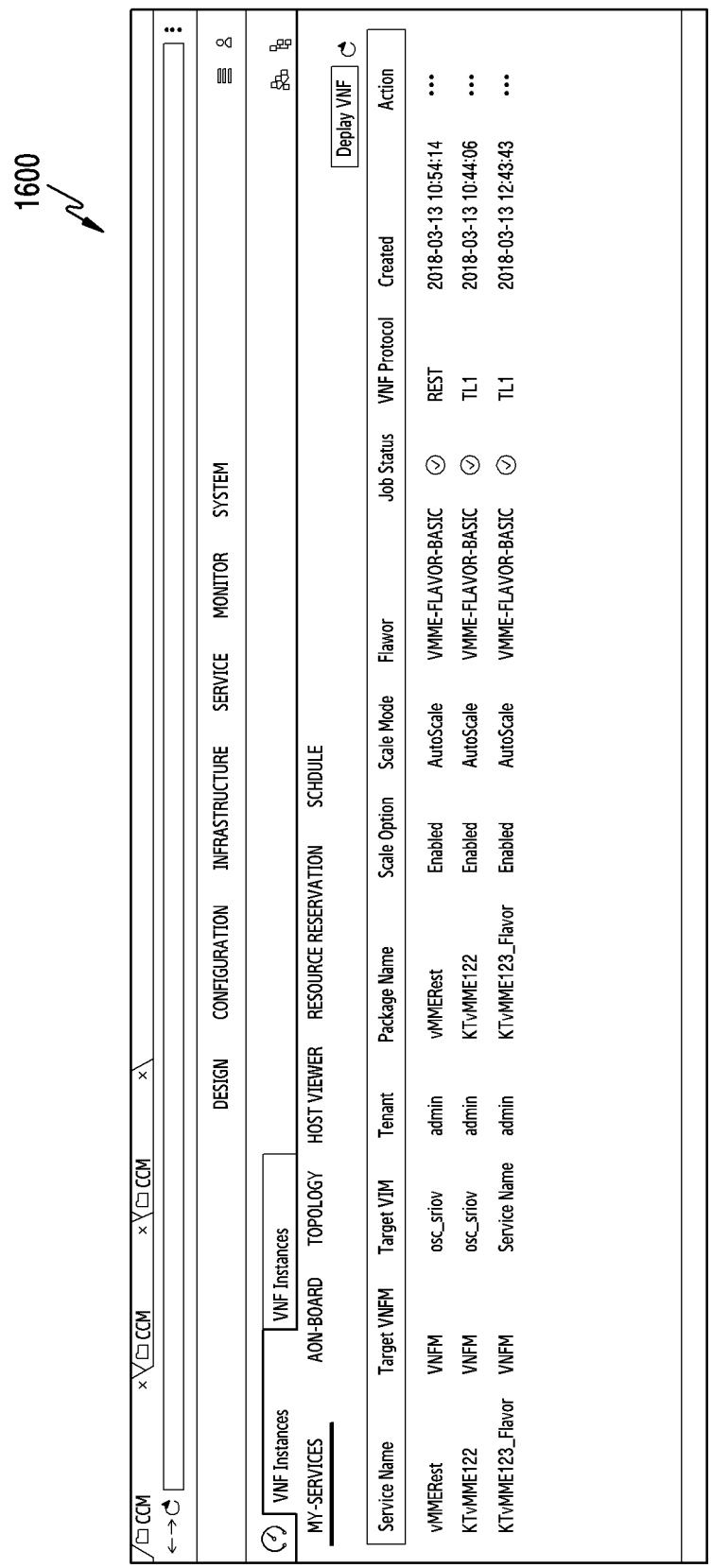
FIG. 16 illustrates a list of virtualized network functions (VNFs) on service in an NFV environment according to various embodiments of the present disclosure.

FIG. 16 illustrates a list of VNFs on service in an NFV environment according to various embodiments of the present disclosure.

Referring to FIG. 16, the NFVO device 141 may display information of the VNFs on service through a UI 1600. For example, the NFVO device 141 may display that the VNFs on service are vMMERest, KTvMME122 and KTvMME123_Flavor, and may display information of the respective VNFs. For example, the NFVO device 141 may display at least one of information of a VNFM device (may be referred to as a 'target VNFM') managing each VNF, information of a VIM device (may be referred to as a 'target VIM') managing a VM which conducts the VNF, a tenant having specific authorization on each VNF, a package name of each VNF, a scale option for each VNF, a scale mode for each VNF, flavor information for each VNF, a job status of each VNF, a VNF protocol for each VNF, and a time at which each VNF is created.

Figure 17:
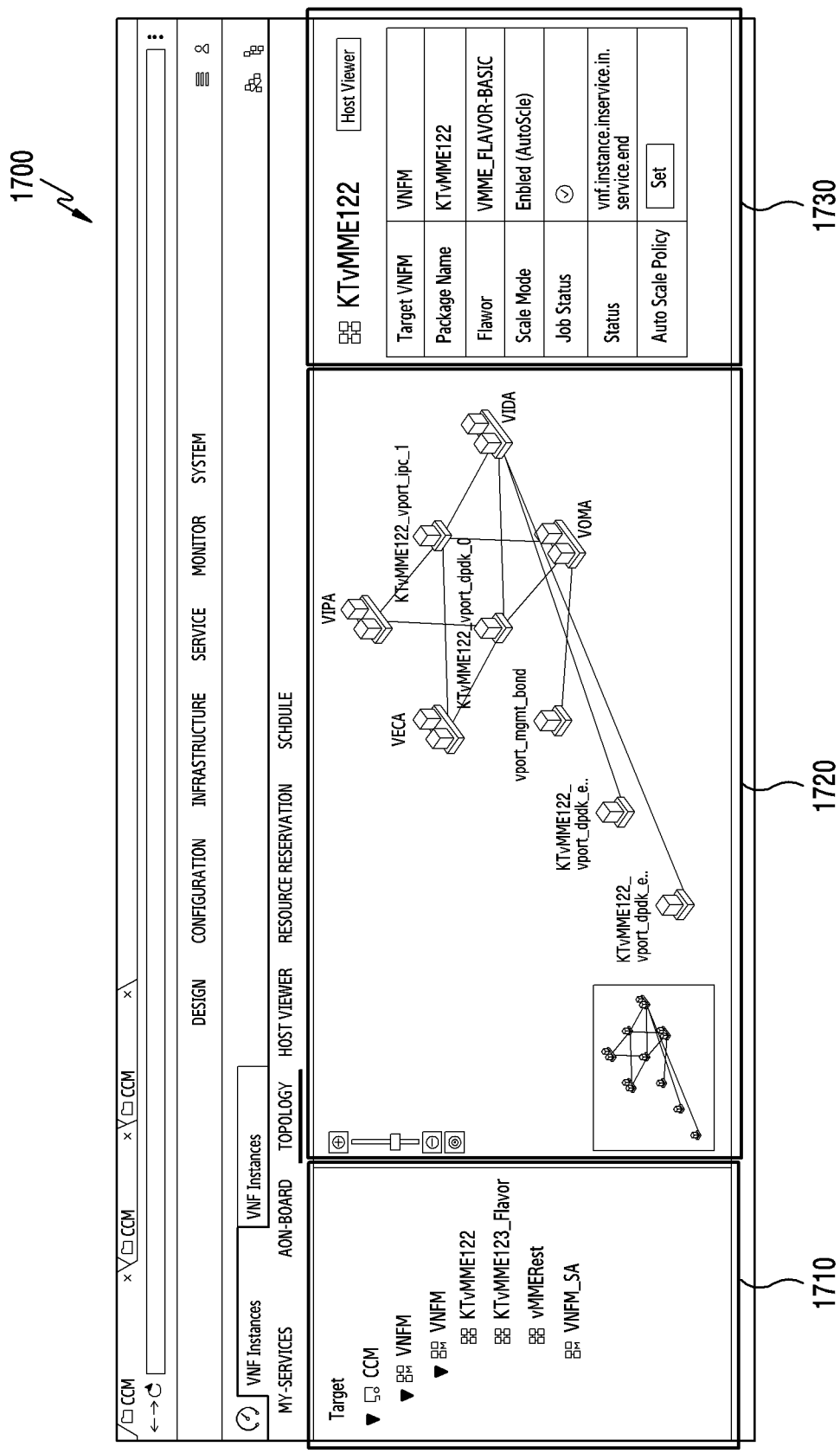
FIG. 17 illustrates a topology of VNFs deployed in an NFV environment according to various embodiments of the present disclosure.

FIG. 17 illustrates a topology of VNFs deployed in an NFV environment according to various embodiments of the present disclosure.

Referring to FIG. 17, the NFVO device 141 displays a list of VNFs on service, and a hierarchical structure of a VNFM which manages the VNFs in an area 1710 of a UI 1700.

In an area 1720, the NFVO device 141 displays the topology of the VNFs deployed in the NFV environment. More specifically, the NFVO device 141 displays the deployment of the VNFs on service, and connection relationships between the VNFs in the area 1720. VNFs connected by a line in an area 1720 may exchange data or control information with each other.

The NFVO device 141 may receive an input for selecting at least one of the VNFs displayed in the area 1720 through the UI 1700. The NFVO device 141 may display information of the VNF selected according to the received input in an area 1730. For example, the VNFO device 141 may display in the area 1730 at least one of an identifier of the VNFM device managing the selected VNF, a package name of the selected VNF, flavor information of the selected VNF, a scale option and/or a scale mode for the selected VNF, a job status of the selected VNF, status of the selected VNF and whether an auto scale policy is set for the selected VNF.

Figure 18A:
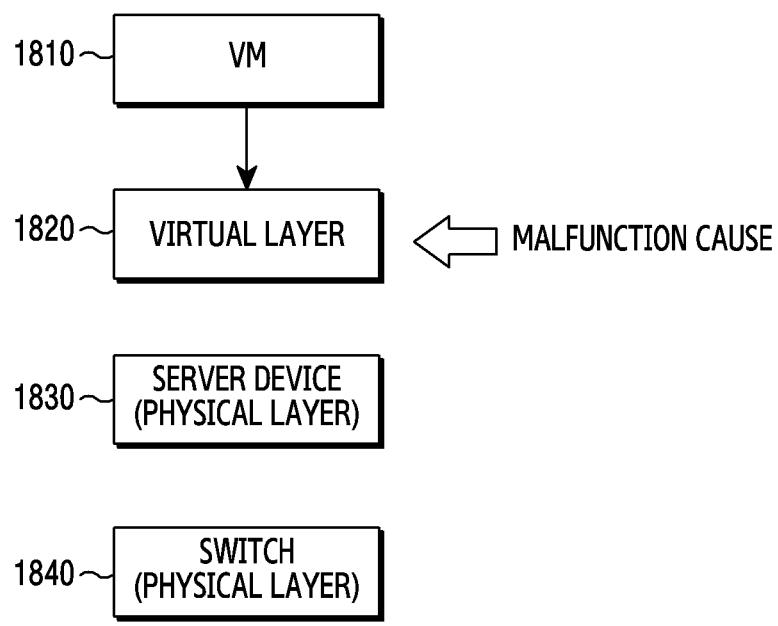
FIG. 18A and FIG. 18D illustrate scenarios for responding to a malfunction in an NFV environment according to various embodiments of the present disclosure.
Figure 18B:
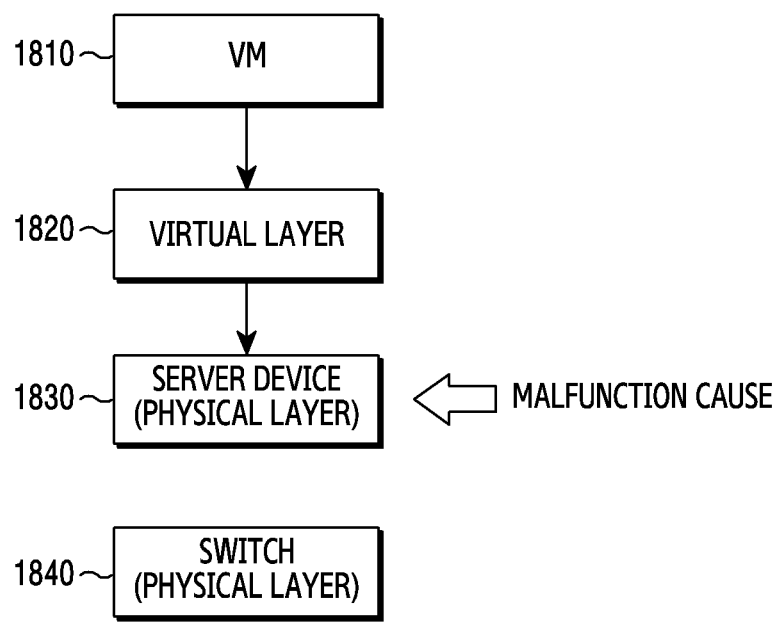
Figure 18C:
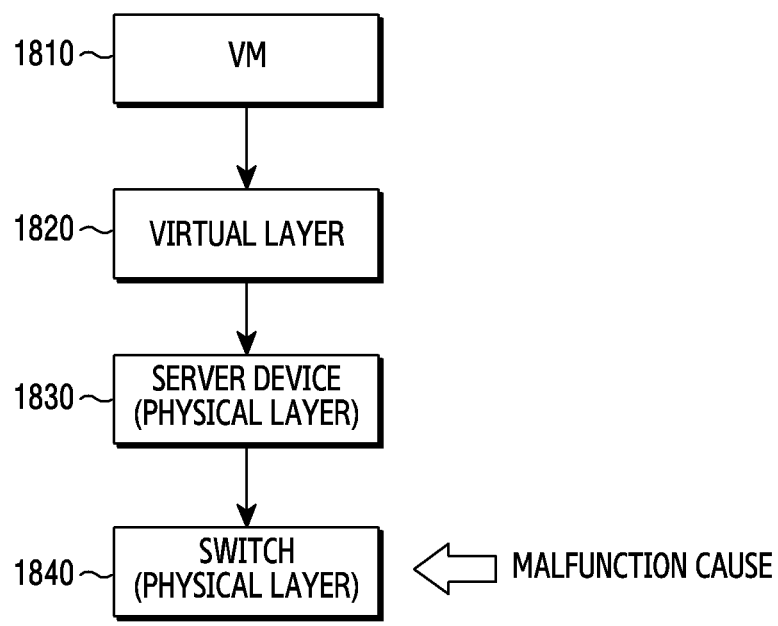
Figure 18D:
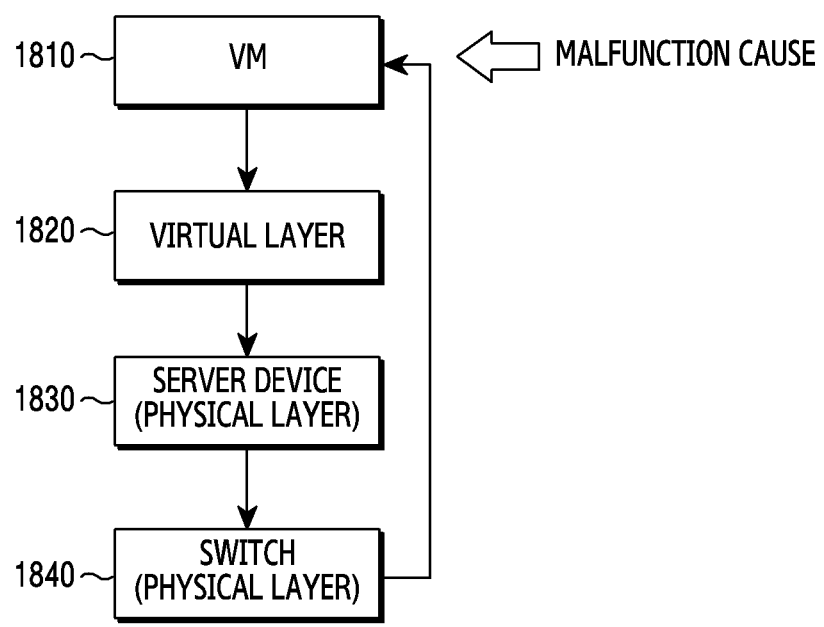

FIG. 18A and FIG. 18D illustrate scenarios for responding to a malfunction in an NFV environment according to various embodiments of the present disclosure. In FIG. 18A through FIG. 18D, since a malfunction is detected in a VM 1810 regardless of a cause of the malfunction, examining for resolving the malfunction starts from examining a virtual layer 1820.

Referring to FIG. 18A, it is assumed that the cause of the malfunction is in the virtual layer 1820. The NFVO device 141 first detects a malfunction in the VM 1810. Next, the NFVO device 141 examines the virtual layer 1820. If a problem is identified in the service of the virtual layer 1820, the NFVO device 141 may perform an operation for solving the problem, or may notify through a UI that it is necessary to examine the virtual layer 1820.

Referring to FIG. 18B, it is assumed that the cause of the malfunction is in a server device 1830. NFVO device 141 first detects the malfunction in the VM 1810. Next, the NFVO device 141 examines the virtual layer 1820. If a problem is not identified in the service of the virtual layer 1820, the NFVO device 141 may examine whether the malfunction occurs in the server device 1830 associated with the virtual layer 1820 and/or a physical port of the server device 1830. If the malfunction is identified in the server device 1830 and/or the physical port of the server device 1830, the NFVO device 141 may notifying through the UI that it is necessary to examine the server device 1830.

Referring to FIG. 18C, it is assumed that the cause of the malfunction is in a switch 1840. The NFVO device 141 first detects the malfunction in the VM 1810. Next, the NFVO device 141 examines the virtual layer 1820. If a problem is not identified in the service of the virtual layer 1820, the NFVO device 141 may examine whether the malfunction occurs in the server device 1830 associated with the virtual layer 1820 and/or the physical port of the server device 1830. If the malfunction is not identified in the server device 1830 and/or the physical port of the server device 1830, the NFVO device 141 may examine whether the malfunction occurs in the switch 1840 connected to the physical port of the server device 1830 and/or the port of the switch 1840. If the malfunction is identified in the switch 1840 and/or the port of the switch 1840, the NFVO device 141 may inform through the UI that it is necessary to examine the switch 1840 and/or the port of the switch 1840.

Referring to FIG. 18D, it is assumed that the cause of the malfunction is in software operating in the VM 1810. The NFVO device 141 first detects the malfunction in the VM 1810. Next, the NFVO device 141 examines the virtual layer 1820. If a problem is not identified in the service of the virtual layer 1820, the NFVO device 141 may examine whether a malfunction occurs in the server device 1830 associated with the virtual layer 1820 and/or the physical port of the server device 1830. If the problem is not identified in the server device 1830 and/or the physical port of the server device 1830, the NFVO device 141 may examine whether a malfunction occurs in the switch 1840 connected to the physical port of the server device 1830 and/or the port of the switch 1840. If the malfunction is not identified in the switch 1840 and/or the port of the switch 1840, the NFVO device 141 may determine no malfunction in the infrastructure and the service, and notify through the UI that it is necessary to examine the software running on the VM.

According to various embodiments of the present disclosure, the association between the physical layer information and the virtual layer information may be used to manage the QoS in the NFV environment. Hereinafter, scenarios for managing quality of service (QoS) is described in FIG. 19A and FIG. 19B.

Figure 19A:
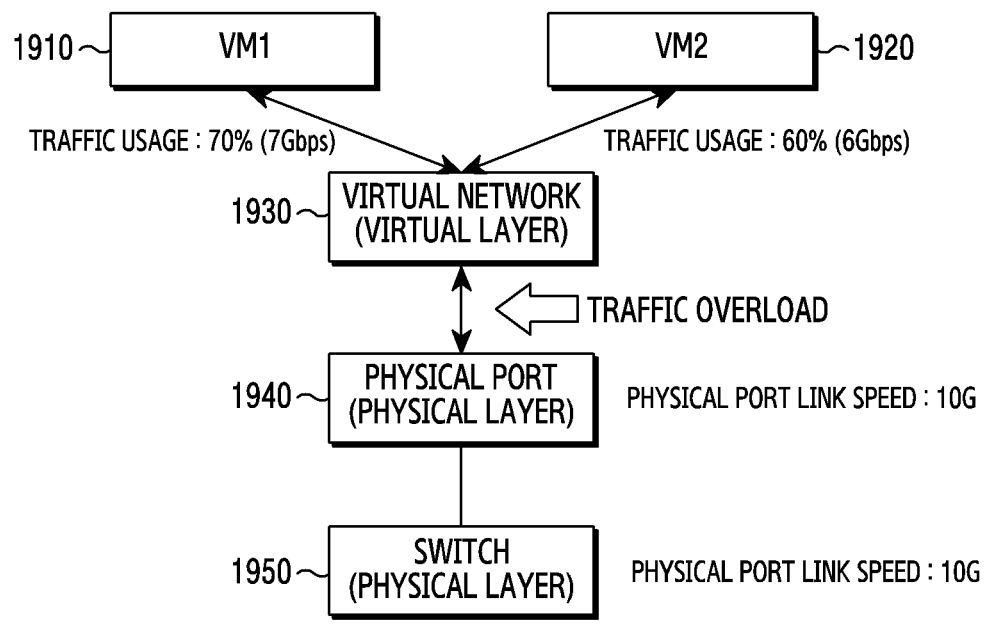
FIG. 19A and FIG. 19B illustrate scenarios for managing quality of service (QoS) in an NFV environment according to various embodiments of the present disclosure.
Figure 19B:
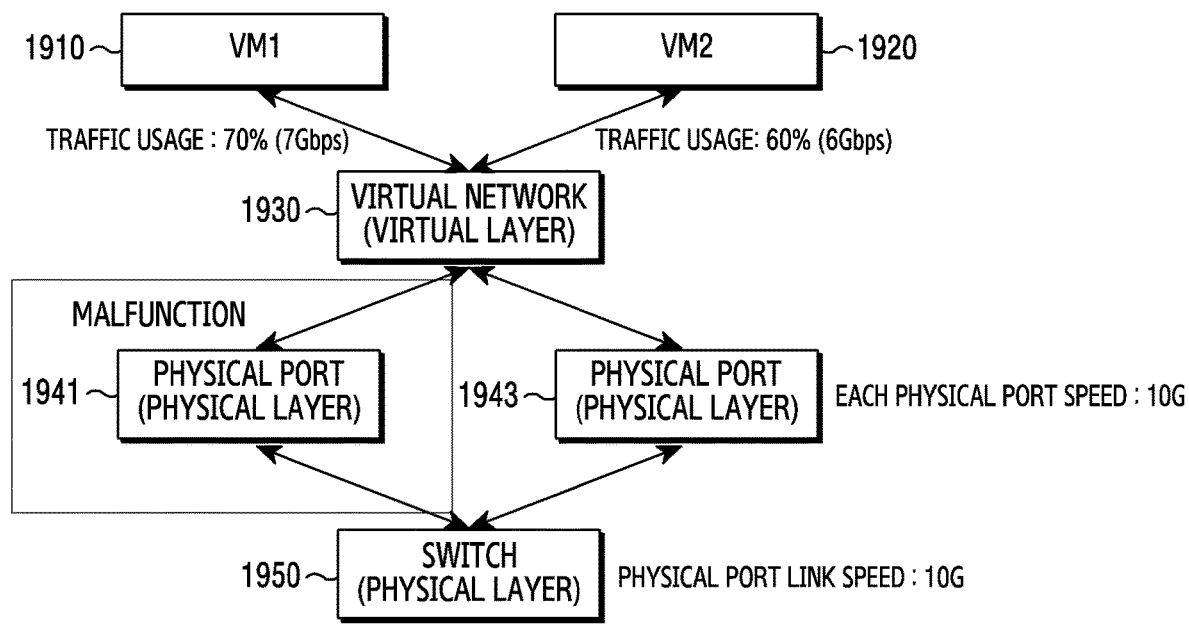

FIG. 19A and FIG. 19B illustrate scenarios for managing QoS in an NFV environment according to various embodiments of the present disclosure.

Referring to FIG. 19A, traffic usage of a VM1 1910 is 7 Gps which is 70% of the maximum available traffic usage, and traffic usage of a VM2 1920 is 6 Gbps which is 60% of the maximum available traffic usage. The VM1 1910 and the VM2 1920 may correspond to a physical port 1940 via a virtual network 1930 (e.g., physnet). However, if a link speed supported by the physical port 1940 is 10 Gbps, the physical port 1940 may not support 13 Gbps which is the sum of the traffic usage (=7 Gbps) of the VM1 1910 and the traffic usage (=6 Gbps) of the VM2 1920, and thus traffic overload may occur between the virtual network 1930 and the physical port 1940. The NFVO device 141 may detect this traffic overload, and may instruct the user to change setting of the virtual network 1930 through a UI. For example, if the setting of the virtual network 1930 is changed such that the virtual network 1930 corresponds to other physical port (for supporting the link speed above 3 Gbps) in addition to the physical port 1940, the physical ports may support the link speed above 13 Gbps, and thus the traffic overload occurring between the virtual network 1930 and the physical port 1940 may be resolved.

Referring to FIG. 19B, the traffic usage of the VM1 1910 is 7 Gps which is 70% of the maximum available traffic usage, and the traffic usage of the VM2 1920 is 6 Gbps which is 60% of the maximum available traffic usage. The VM1 1910 and the VM2 1920 may correspond to a physical port 1 1941 and a physical port 2 1943 via the virtual network 1930 (e.g., physnet). That is, if the physical port 1 1941 and the physical port 2 1943 operate normally, the physical port 1 1941 and the physical port 2 1943 may support the link speed of 20 Gbps, and may support 13 Gbps which is the sum of the traffic usage (=7 Gbps) of the VM1 1910 and the traffic usage (=6 Gbps) of the VM2 1920. However, if a malfunction (e.g., NICPortLinkDown) occurs in the physical port 1 1941 and the physical port 1 1941 is down, the physical port 2 1943 alone may not support 13 Gbps which is the sum of the traffic usage (=7 Gbps) of the VM1 1910 and the traffic usage (=6 Gbps) of the VM2 1920, and thus a malfunction may occur. The NFVO device 141 may detect this malfunction, and notify through the UI that the physical port 1 1941 is down. As another example, if the NFVO device 141 detects that the physical port 1 1941 is down, the NFVO device 141 may control to stop the operation of one of the VM1 1910 and the VM2 1920 without notification, and thus control one VM to operate normally and automatically resolve the possibility of the malfunction. As another example, if the NFVO device 141 detects that the physical port 1 1941 is down, the NFVO device 141 may resolve the possibility of the malfunction by performing a preset operation. For example, if the physical port 1 1941 is down, the NFVO device 141 may resolve the possibility of the malfunction by changing the virtual compute node which manages the VM2 1920 (in this case, the VM2 1920 may correspond to a physical port different from the physical port 1 1941 and the physical port 2 1943), or may enable the VM2 1920 to perform failover (e.g., temporarily reduce the traffic usage) and to resolve the possibility of the malfunction, by notifying the VM2 1920 of malfunction and/or possible malfunction failure information (e.g., information indicating that the physical port corresponding to the VM2 1920 is down).

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. A plurality of memories may be included.

Also, the program may be stored in an attachable storage device accessible via a communication network such as Internet, Intranet, local area network (LAN), wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment of the present disclosure.

In the specific embodiments of the disclosure, the elements included in the disclosure are expressed in a singular or plural form. However, the singular or plural expression is appropriately selected according to a proposed situation for the convenience of explanation, the disclosure is not limited to a single element or a plurality of elements, the elements expressed in the plural form may be configured as a single element, and the elements expressed in the singular form may be configured as a plurality of elements.

Meanwhile, while the specific embodiment has been described in the explanations of the present disclosure, it will be noted that various changes may be made therein without departing from the scope of the disclosure. Thus, the scope of the disclosure is not limited and defined by the described embodiment and is defined not only the scope of the claims as below but also their equivalents.

The invention claimed is:

1. A method performed by a control device in a network function virtualization (NFV) environment, the method comprising:
   determining a virtual compute node corresponding to a server device;
   identifying physical layer information related to the server device, and virtual layer information related to the virtual compute node;
   displaying the physical layer information and the virtual layer information; and
   examining a malfunction in a virtual layer to detect a malfunction in at least one virtual machine, VM, which operates in the virtual compute node,
   wherein association between the physical layer information and the virtual layer information is used to manage quality of service, QoS, in the NFV environment;
   in case that a malfunction is not detected in the virtual layer, examining a malfunction in a server device associated with the virtual layer and a physical port of the server device;
   in case that a malfunction is not detected in the server device and the physical port, examining a malfunction in a switch connected to the physical port of the server device and a port of the switch,
   in case that a malfunction is not detected in the switch and the port of the switch, determining no malfunction is occurred in an infrastructure and a service, and displaying that it is necessary to examine a software running on the at least one VM,
   in case that a malfunction is detected in at least one of the virtual layer, the server device, the physical port, the switch, and the port of the switch, displaying information indicating the malfunction of the at least one VM, information indicating the server device including the physical port corresponding to the at least one VM, information of the switch connected to the physical port, and virtual layer information related to the at least one VM;
   in case that a malfunction is detected in the physical port and a sum of traffic usage of the at least one VM is not supported, notifying through a user interface that the physical port is down; and
   in case that a malfunction is detected in the physical port and a sum of traffic usage of the at least one VM is not supported, controlling one of the at least one VM to stop an operation without notification.

2. The method of claim 1, wherein the physical layer information comprises at least one of a host name of the server device, a location of the server device, and at least one physical port disposed in the server device, and
   the virtual layer information comprises at least one of a hostname of the virtual compute node, information of at least one virtual machine (VM) operating in the virtual compute node, information of at least one virtual network function (VNF) performed by the at least one VM, information of a virtual infrastructure manager (VIM) device for managing the virtual compute node, and information of a VNF manager (VNFM) device for managing the at least one VNF.

3. The method of claim 2, further comprising:
displaying correspondence between a VM of the at least one VM, and a physical port corresponding to the VM among the at least one physical port.

4. The method of claim 2, further comprising:
receiving an input for selecting the VM of the at least one VM; and
in response to the input, displaying detailed information of the selected VM,
wherein the detailed information of the VM comprises at least one of the hostname of the virtual compute node where the VM operates, the hostname of the server device corresponding to the virtual compute node, an identifier of the VM, an identifier of the VNF performed at the VM, at least one internet protocol (IP) address related to the VM, a size of virtual resources allocated to the VM, and a location of a storage related to the VM.

5. The method of claim 1, further comprising:
determining virtual compute nodes corresponding to a group of server devices comprising the server device; and
in response to receiving an input for selecting the group of the server devices, displaying physical layer information related to the group of the server devices and virtual layer information related to the virtual compute nodes.

6. The method of claim 1, further comprising:
detecting a malfunction of at least one VM which operates in the virtual compute node; and
displaying first information related to the malfunction in the physical layer information, and second information related to the malfunction in the virtual layer information.

7. The method of claim 1, wherein determining the virtual compute node corresponding to the server device comprises:
determining an identification key of the virtual compute node, based on identification information received from a VIM device;
receiving an identification key of the server device from a physical infrastructure manager (PIM) device; and
determining the virtual compute node corresponding to the server node, based on matching the identification key of the virtual compute node and the identification key of the server device,
wherein the identification key of the server device is determined by the PIM based on the identification information.

8. The method of claim 7, wherein the identification information comprises at least one of an identifier of the virtual compute node, and a user identifier of the VIM.

9. The method of claim 8, wherein the identification information comprises the identifier of the virtual compute node and the user identifier of the VIM, and
determining the identification key of the virtual compute node comprises:
hashing the identifier of the virtual compute node and the user identifier of the VIM, wherein a result of the hashing is the identification key of the virtual compute node.

10. A control device in a network function virtualization (NFV) environment, the control device comprising:
at least one transceiver; and
at least one processor operably coupled with the at least one transceiver,
wherein the at least one processor is configured to:
determine a virtual compute node corresponding to a server device,
identify physical layer information related to the server device, and virtual layer information related to the virtual compute node,
display the physical layer information and the virtual layer information, and
examine a malfunction in a virtual layer to detect a malfunction in at least one virtual machine, VM, which operates in the virtual compute node,
wherein association between the physical layer information and the virtual layer information is used to manage quality of service, QoS, in the NFV environment,
in case that a malfunction is not detected in the virtual layer, examine a malfunction in a server device associated with the virtual layer and a physical port of the server device,
in case that a malfunction is not detected in the server device and the physical port, examine a malfunction in a switch connected to the physical port of the server device and a port of the switch,
in case that a malfunction is not detected in the switch and the port of the switch, determine no malfunction is occurred in an infrastructure and a service, and display that it is necessary to examine a software running on the at least one VM,
in case that a malfunction is detected in at least one of the virtual layer, the server device, the physical port, the switch, and the port of the switch, display information indicating the malfunction of the at least one VM, information indicating the server device including the physical port corresponding to the at least one VM, information of the switch connected to the physical port, and virtual layer information related to the at least one VM,
in case that a malfunction is detected in the physical port and a sum of traffic usage of the at least one VM is not supported, notifying through a user interface that the physical port is down, and
in case that a malfunction is detected in the physical port and a sum of traffic usage of the at least one VM is not supported, controlling one of the at least one VM to stop an operation without notification.

11. The control device of claim 10,
wherein the physical layer information comprises at least one of a host name of the server device, a location of the server device, and at least one physical port disposed in the server device, and
wherein the virtual layer information comprises at least one of a hostname of the virtual compute node, information of at least one virtual machine (VM) operating in the virtual compute node, information of at least one virtual network function (VNF) performed by the at least one VN, information of a virtual infrastructure manager (VIM) device for managing the virtual compute node, and information of a VNF manager (VNFM) device for managing the at least one VNF.

12. The control device of claim 11, wherein the at least one processor is further configured to display correspondence between a VM of the at least one VM, and a physical port corresponding to the VM among the at least one physical port.

13. The control device of claim 11, wherein the at least one processor is further configured to:

receive an input for selecting the VM of the at least one VM; and in response to the input, display detailed information of the selected VM, wherein the detailed information of the VM comprises at least one of the hostname of the virtual compute node where the VM operates, the hostname of the server device corresponding to the virtual compute node, an identifier of the VM, an identifier of the VNF performed at the VM, at least one internet protocol (IP) address related to the VM, a size of virtual resources allocated to the VM, and a location of a storage related to the VM.

14. The control device of claim 10, wherein the at least one processor is further configured to:

determine virtual compute nodes corresponding to a group of server devices comprising the server device; and in response to receiving an input for selecting the group of the server devices, display physical layer information related to the group of the server devices and virtual layer information related to the virtual compute nodes.

15. The control device of claim 10, wherein the at least one processor is further configured to:

detect a malfunction of at least one VM which operates in the virtual compute node; and display first information related to the malfunction in the physical layer information, and second information related to the malfunction in the virtual layer information.

16. The control device of claim 10, wherein the at least one processor is further configured to:

determine an identification key of the virtual compute node, based on identification information received from a VIM device;

receive an identification key of the server device from a physical infrastructure manager (PIM) device; and determine the virtual compute node corresponding to the server node, based on matching the identification key of the virtual compute node and the identification key of the server device, wherein the identification key of the server device is determined by the PIM based on the identification information.

\* \* \* \* \*